United States Patent
Yao et al.

(10) Patent No.: US 12,245,159 B2
(45) Date of Patent: Mar. 4, 2025

(54) TRANSMISSION PARAMETER DETERMINING METHOD, ELECTRONIC APPARATUS, DEVICE, AND MEDIUM

(71) Applicant: ZTE CORPORATION, Guangdong (CN)

(72) Inventors: Ke Yao, Shenzhen (CN); Zhen He, Shenzhen (CN); Bo Gao, Shenzhen (CN); Chuangxin Jiang, Shenzhen (CN); Zhaohua Lu, Shenzhen (CN); Shujuan Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 326 days.

(21) Appl. No.: 17/738,866

(22) Filed: May 6, 2022

(65) Prior Publication Data

US 2023/0024375 A1    Jan. 26, 2023

Related U.S. Application Data

(63) Continuation of application No. PCT/CN2020/126516, filed on Nov. 4, 2020.

(30) Foreign Application Priority Data

Nov. 8, 2019  (CN) .......................... 201911090408.1

(51) Int. Cl.
*H04W 52/14*    (2009.01)
*H04W 52/24*    (2009.01)

(52) U.S. Cl.
CPC ....... *H04W 52/146* (2013.01); *H04W 52/242* (2013.01)

(58) Field of Classification Search
CPC .......................... H04W 52/146; H04W 52/242
See application file for complete search history.

(56) References Cited

U.S. PATENT DOCUMENTS 9,432,158 B2    8/2016    Yamada
11,109,323 B2    8/2021    Gao et al.
(Continued)

FOREIGN PATENT DOCUMENTS

CN    102148670 A    8/2011
CN    104349443 B    2/2015
(Continued)

OTHER PUBLICATIONS

Ericsson, "Uplink Power Control Enhancement for NR URLLC", 3GPP TSG RAN WG1 Meeting #97, Tdoc R1-1906111, May 17, 2019, Reno, Nevada, USA (5 pages).

(Continued)

*Primary Examiner* — Junpeng Chen
(74) *Attorney, Agent, or Firm* — Foley & Lardner LLP

(57) ABSTRACT

Provided are a transmitting parameter determination method, an electronic device, an apparatus and a medium. The transmitting parameter determination method includes: determining a power control parameter of physical uplink shared channel (PUSCH) transmission according to association information between a sounding reference signal resource indicator (SRI) and a PUSCH power control parameter. The power control parameter of the PUSCH transmission includes at least one of an open-loop power control parameter of a PUSCH, a closed-loop power control parameter of a PUSCH, or a pathloss measurement parameter of a PUSCH.

6 Claims, 5 Drawing Sheets

(56) References Cited

U.S. PATENT DOCUMENTS

| | | | |
|---|---|---|---|
| 2017/0367105 A1 | 12/2017 | Kim et al. | |
| 2019/0044681 A1 | 2/2019 | Zhang | |
| 2019/0190747 A1 | 6/2019 | Park et al. | |
| 2019/0261281 A1 | 8/2019 | Jung et al. | |
| 2020/0059867 A1 | 2/2020 | Haghighat et al. | |
| 2021/0029650 A1* | 1/2021 | Cirik | H04W 52/248 |
| 2022/0116882 A1* | 4/2022 | Guo | H04W 52/146 |
| 2022/0232482 A1* | 7/2022 | Matsumura | H04W 52/242 |
| 2022/0271890 A1* | 8/2022 | Grossmann | H04L 5/0051 |
| 2022/0330173 A1* | 10/2022 | Matsumura | H04L 5/0051 |
| 2022/0369242 A1* | 11/2022 | Matsumura | H04W 52/42 |

FOREIGN PATENT DOCUMENTS

| | | |
|---|---|---|
| CN | 107889209 A | 4/2018 |
| CN | 109803362 A | 5/2019 |
| CN | 110167122 A | 8/2019 |
| CN | 110392418 A | 10/2019 |
| CN | 111092710 A | 5/2020 |
| CN | 114900876 A | 8/2022 |
| EP | 3 247 163 B1 | 11/2017 |
| EP | 3 793 272 A1 | 3/2021 |
| JP | 2013-236289 A | 11/2013 |
| RU | 2701380 C1 | 9/2019 |
| WO | WO-2018/003645 A2 | 1/2018 |

OTHER PUBLICATIONS

Notification of Registration and Grant for CN Appl. No. 202211429498.4, dated Sep. 8, 2023 (with English translation, 6 pages).

"3rd Generation Partnership Project; Technical Specification Group Radio Access Network; NR; Physical layer procedures for control (Release 15)", 3GPP TS 38.213, V15.7.0 (Sep. 2019) (108 pages).

"3rd Generation Partnership Project; Technical Specification Group Radio Access Network; NR; Radio Resource Control (RRC) protocol specification (Release 15)", 3GPP TS 38.331, V15.7.0 (Sep. 2019) (527 pages).

Ericsson, "Enhancements to multibeam operation", 3GPP TSG-RAN WG1 Meeting #98, Tdoc R1-1909225, Aug. 30, 2019, Prague, Czech Republic (23 pages).

Extended European Search Report for EP Appl. No. 20885568.4, dated Feb. 23, 2024 (11 pages).

LG Electronics, "Feature lead summary#4 of Enhancements on Multi-beam Operations", 3GPP TSG RAN WG1 Meeting #99, R1-1913453, Nov. 22, 2019, Reno, USA (39 pages).

ZTE, "Enhancements on multi-beam operation", 3GPP TSG RAN WG1 Meeting #99, R1-1911931, Nov. 22, 2019, Reno, US (18 pages).

VIVO, "Remaining issues on non-CA UL power control" 3GPP TSG RAN WG1 Meeting #92bis, R1-1803842, Apr. 20, 2018, Sanya, China (5 pages).

First Office Action for CN Appl. No. 202211429498.4, dated Jun. 20, 2023 (with English translation, 18 pages).

Intel Corporation, "On Power Control Framework" 3GPP TSG RAN WG1 Meeting #92bis, R1-1804736, Apr. 20, 2018, Sanya, China (5 pages).

International Search Report and Written Opinion for PCT Appl. No. PCT/CN2020/126516, mailed Feb. 5, 2021 (11 pages, with English translation).

Mediatek Inc., "Enhancements on multi-beam operations" 3GPP TSG RAN WG1 #97, R1-1906537, May 17, 2019, Reno, USA (13 pages).

* cited by examiner

Determine a CC group and a transmitting parameter of uplink transmission of a CC in the CC group according to an MAC CE — S110

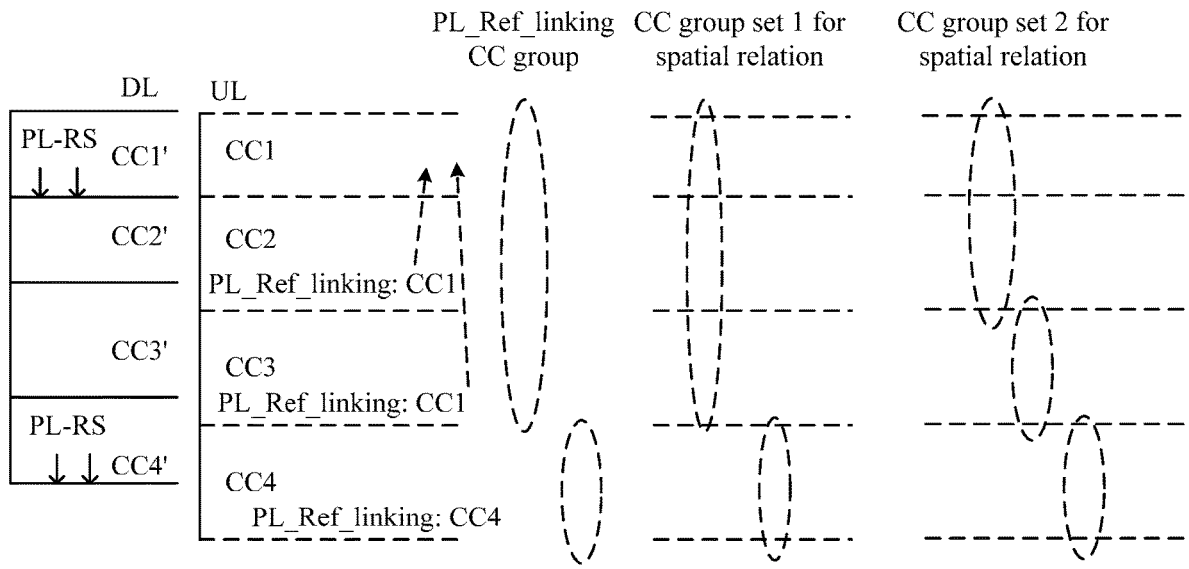

| Transmit an MAC CE to a first node device to enable the first node device to determine a CC group and a sending parameter of uplink transmission of each CC in the CC group according to the MAC CE | ~ S210 |

| Transmit a pathloss measurement parameter pool configured by a high layer | ~ S220 |

| Determine a power control parameter of PUSCH transmission according to association information between an SRI and a PUSCH power control parameter, where the power control parameter of the PUSCH transmission includes at least one of an open-loop power control parameter of the PUSCH, a closed-loop power control parameter of the PUSCH, or a pathloss measurement parameter of the PUSCH | ~ S310 |

FIG. 6

Configure, reconfigure or update association information between an SRI and a PUSCH power control parameter through high layer signaling, or activate, deactivate or update association information between an SRI and a PUSCH power control parameter through an MAC CE, where the association information between the SRI and the PUSCH power control parameter is used for determining, by a first node device, a power control parameter of PUSCH transmission ~ S410

FIG. 7

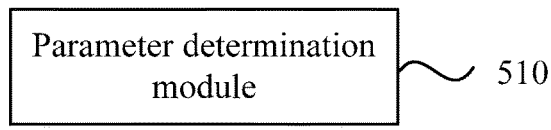

FIG. 8

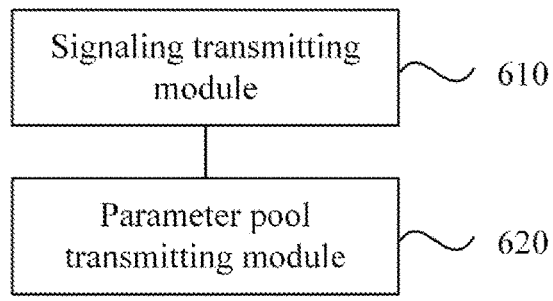

FIG. 9

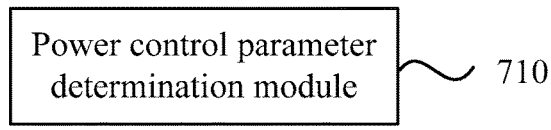

FIG. 10

TRANSMISSION PARAMETER DETERMINING METHOD, ELECTRONIC APPARATUS, DEVICE, AND MEDIUM

CROSS-REFERENCE TO RELATED APPLICATIONS

This application claims the benefit of priority under 35 U.S.C. § 120 as a continuation of PCT Patent Application No. PCT/CN2020/126516, filed on Nov. 4, 2020, which claims priority to Chinese Patent Application No. 201911090408.1, filed on Nov. 8, 2019, the disclosure of each of which is incorporated herein by reference in its entirety.

TECHNICAL FIELD

The present application relates to the field of communications, for example, to a transmitting parameter determination method, an electronic device, an apparatus and a medium.

BACKGROUND

One of the key features of new radio (NR) technology in a fifth generation mobile communication system is supporting high frequency bands. There are abundant frequency domain resources at the high frequency bands, but there is a problem of small coverage caused by fast attenuation of radio signals. The manner of transmitting signals using beams can concentrate energies within a relatively small spatial range, thereby improving the coverage of signals at the high frequency bands. In a beam scenario, a beam pair between a base station and a terminal (or a user equipment (UE)) may vary with time and positions, so a flexible beam updating mechanism is needed to determine an appropriate transmitting parameter of uplink transmission.

In related technology, the transmitting parameter of uplink transmission is updated mainly by using medium access control-control element (MAC CE) signaling, but this mechanism for determining the transmitting parameter of uplink transmission is not perfect.

SUMMARY

The present application provides a transmitting parameter determination method, an electronic apparatus, a device and a medium, and optimizes the mechanism for determining a transmitting parameter of uplink transmission.

An embodiment of the present application provides a transmitting parameter determination method. The method is applied to a first node device and includes the steps described below.

A component carrier (CC) group and a transmitting parameter of uplink transmission of a CC in the CC group are determined according to an MAC CE.

The transmitting parameter of the uplink transmission includes spatial relation information and/or power control parameter information.

The uplink transmission includes at least one of sounding reference signal (SRS) transmission, physical uplink shared channel (PUSCH) transmission or physical uplink control channel (PUCCH) transmission.

An embodiment of the present application further provides a transmitting parameter determination method. The method is applied to a second node device and includes the steps described below.

An MAC CE is sent to a first node device to enable the first node device to determine a CC group and a transmitting parameter of uplink transmission of a CC in the CC group according to the MAC CE.

The transmitting parameter of the uplink transmission includes spatial relation information and/or power control parameter information.

The uplink transmission includes at least one of SRS transmission, PUSCH transmission or PUCCH transmission.

A pathloss measurement parameter pool configured by a high layer is sent.

The pathloss measurement parameter pool configured by the high layer has the features described below.

A CC or a BWP configured with an SRS is independently configured with a pathloss measurement parameter pool of an SRS.

More than one CC or BWP configured with an SRS share a pathloss measurement parameter pool of an SRS.

More than one CC or BWP configured with an SRS share a pathloss measurement parameter pool of an SRS. Multiple CCs reference an RS of the same CC to measure pathloss.

On the same CC or BWP, or in the same CC group, an SRS and a PUSCH share a pathloss measurement parameter pool.

On the same CC or BWP, or in the same CC group, an SRS and a PUCCH share a pathloss measurement parameter pool.

On the same CC or BWP, or in the same CC group, a PUSCH and a PUCCH share a pathloss measurement parameter pool.

On the same CC or BWP, or in the same CC group, an SRS, a PUSCH and a PUCCH share a pathloss measurement parameter pool.

An embodiment of the present application further provides a transmitting parameter determination method. The method is applied to a first node device and includes the steps described below.

A power control parameter of PUSCH transmission is determined according to association information between an SRI and a PUSCH power control parameter.

The power control parameter of the PUSCH transmission includes at least one of an open-loop power control parameter of a PUSCH, a closed-loop power control parameter of a PUSCH, or a pathloss measurement parameter of a PUSCH.

An embodiment of the present application further provides a transmitting parameter determination method. The method is applied to a second node device and includes the steps described below.

Association information between an SRI and a PUSCH power control parameter is configured, reconfigured or updated through high layer signaling, or is activated, deactivated or updated through an MAC CE.

The association information between the SRI and the PUSCH power control parameter is used for determining, by a first node device, a power control parameter of PUSCH transmission.

The power control parameter of the PUSCH transmission includes at least one of an open-loop power control parameter of a PUSCH, a closed-loop power control parameter of a PUSCH, or a pathloss measurement parameter of a PUSCH.

An embodiment of the present disclosure further provides an electronic device. The electronic device is configured on a first node device and includes a transmitting parameter determination module.

The transmitting parameter determination module is configured to determine a component carrier (CC) group and a transmitting parameter of uplink transmission of a CC in the CC group according to a medium access control-control element (MAC CE).

The transmitting parameter of the uplink transmission includes spatial relation information and/or power control parameter information.

The uplink transmission includes at least one of sounding reference signal (SRS) transmission, physical uplink shared channel (PUSCH) transmission or physical uplink control channel (PUCCH) transmission.

An embodiment of the present disclosure further provides an electronic device. The electronic device is configured on a second node device and includes a signaling transmitting module and a parameter pool transmitting module.

The signaling transmitting module is configured to transmit an MAC CE to a first node device to enable the first node device to determine a CC group and a transmitting parameter of uplink transmission of a CC in the CC group according to the MAC CE.

The transmitting parameter of the uplink transmission includes spatial relation information and/or power control parameter information.

The uplink transmission includes at least one of SRS transmission, PUSCH transmission or PUCCH transmission.

The parameter pool transmitting module is configured to transmit a pathloss measurement parameter pool configured by a high layer.

A power control parameter pool configured by the high layer has the features described below.

A CC or a BWP configured with an SRS is independently configured with a pathloss measurement parameter pool of an SRS.

More than one CC or BWP configured with an SRS share a pathloss measurement parameter pool of an SRS.

More than one CC or BWP configured with an SRS share a pathloss measurement parameter pool of an SRS. Multiple CCs reference an RS the same CC to measure pathloss.

On the same CC or BWP, or in the same CC group, an SRS and a PUSCH share a pathloss measurement parameter pool.

On the same CC or BWP, or in the same CC group, an SRS and a PUCCH share a pathloss measurement parameter pool.

On the same CC or BWP, or in the same CC group, a PUSCH and a PUCCH share a pathloss measurement parameter pool.

On the same CC or BWP, or in the same CC group, an SRS, a PUSCH and a PUCCH share a pathloss measurement parameter pool.

An embodiment of the present disclosure further provides an electronic device. The electronic device is configured on a first node device and includes a power control parameter determination module.

The power control parameter determination module is configured to determine a power control parameter of PUSCH transmission according to association information between an SRI and a PUSCH power control parameter.

The power control parameter of the PUSCH transmission includes at least one of an open-loop power control parameter of a PUSCH, a closed-loop power control parameter of a PUSCH, or a pathloss measurement parameter of a PUSCH.

An embodiment of the present disclosure further provides an electronic device. The electronic device is configured on a second node device and includes an association information determination module.

The association information determination module is configured to configure, reconfigure or update association information between an SRI and a PUSCH power control parameter through high layer signaling, or to activate, deactivate or update association information between an SRI and a PUSCH power control parameter through an MAC CE.

The association information between the SRI and the PUSCH power control parameter is used for determining, by a first node device, a power control parameter of PUSCH transmission.

The power control parameter of the PUSCH transmission includes at least one of an open-loop power control parameter of a PUSCH, a closed-loop power control parameter of a PUSCH, or a pathloss measurement parameter of a PUSCH.

An embodiment of the present application further provides a first node device. The first node device includes one or more processors and a storage device.

The storage device is configured to store one or more programs.

When the one or more programs are executed by the one or more processors, the one or more processors implement the first transmitting parameter determination method described above.

An embodiment of the present application further provides a second node device. The second node device includes one or more processors and a storage device.

The storage device is configured to store one or more programs.

When the one or more programs are executed by the one or more processors, the one or more processors implement the second transmitting parameter determination method described above.

An embodiment of the present application further provides a first node device. The first node device includes one or more processors and a storage device.

The storage device is configured to store one or more programs.

When the one or more programs are executed by the one or more processors, the one or more processors implement the third transmitting parameter determination method described above.

An embodiment of the present application further provides a second node device. The second node device includes one or more processors and a storage device.

The storage device is configured to store one or more programs.

When the one or more programs are executed by the one or more processors, the one or more processors implement the fourth transmitting parameter determination method described above.

An embodiment of the present application further provides a computer storage medium. The computer storage medium stores a computer program. The computer program, when executed by a processor, implements the first transmitting parameter determination method described above.

An embodiment of the present application further provides a computer storage medium. The computer storage medium stores a computer program. The computer program, when executed by a processor, implements the second transmitting parameter determination method described above.

An embodiment of the present application further provides a computer storage medium. The computer storage medium stores a computer program. The computer program, when executed by a processor, implements the third transmitting parameter determination method described above.

An embodiment of the present application further provides a computer storage medium. The computer storage medium stores a computer program. The computer program, when executed by a processor, implements the fourth transmitting parameter determination method described above.

According to the embodiments of the present application, a CC group and a transmitting parameter of uplink transmission, including spatial relation information and/or power control parameter information, of each CC in a CC group are determined according to an MAC CE, and a power control parameter of PUSCH transmission among transmitting parameters is further determined according to association information between an SRI and a PUSCH power control parameter. This solves the problem that a mechanism for determining a transmitting parameter of uplink transmission is not perfect, and optimizes the mechanism for determining a transmitting parameter of uplink transmission.

BRIEF DESCRIPTION OF DRAWINGS

FIG. 4 is a schematic diagram of a relation among a spatial relation, a CC group, and a first-type CC group determined by a pathloss reference linking parameter according to an embodiment of the present application;

FIG. 5 is a flowchart of a transmitting parameter determination process according to an embodiment of the present application;

FIG. 6 is a flowchart of a transmitting parameter determination process according to an embodiment of the present application;

FIG. 7 is a flowchart of a transmitting parameter determination process according to an embodiment of the present application;

FIG. 8 is a structural diagram of an electronic device according to an embodiment of the present application;

FIG. 9 is a structural diagram of an electronic device according to an embodiment of the present application;

FIG. 10 is a structural diagram of an electronic device according to an embodiment of the present application;

DETAILED DESCRIPTION

Figure 1:
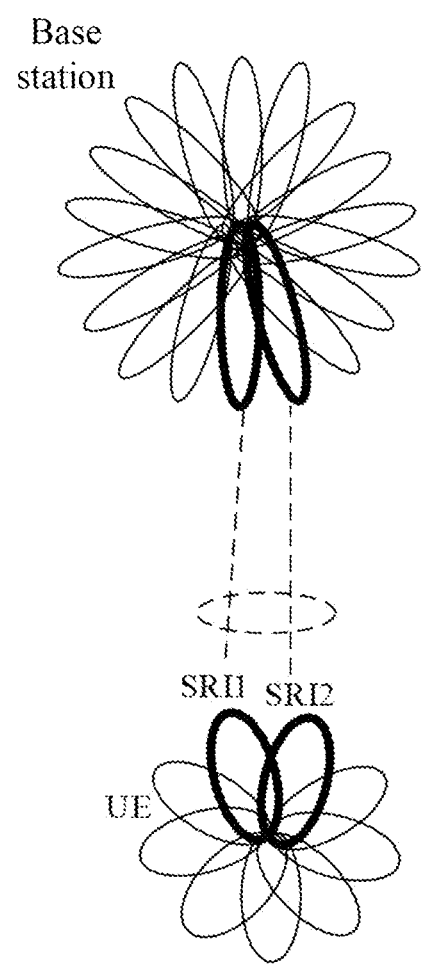
FIG. 1 is a schematic diagram of a trained beam relation between a base station and a UE according to an embodiment of the present application.

Embodiments of the present application are described below in conjunction with the drawings.

One of the key features of new radio (NR) technology in a fifth generation mobile communication system is supporting high frequency bands. There are abundant frequency domain resources at the high frequency bands, but there is a problem of a small coverage caused by fast attenuation of radio signals. The manner of transmitting signals using beams can concentrate energies within a relatively small spatial range, thereby improving the coverage of signals at the high frequency bands. In a beam scenario, a beam pair between a base station and a terminal (a user equipment (UE)) may vary with time and positions, so a flexible beam updating mechanism is needed. To support flexible beam variations, signaling overhead increases.

A beam may be a resource. For example, a transmitting spatial filter, a receiving spatial filter, transmitting precoding, receiving precoding, an antenna port, an antenna weight vector or an antenna weight matrix may each be used as the beam. The beam may be a transmitting mode or a receiving mode of transmission, including at least one of the following modes: space division multiplexing, frequency domain/time domain diversity, and the like.

The transmitting mode or the beam of transmission may be indicated by using a reference signal resource index or a spatial relation index. A beam or a transmitting mode or a receiving mode of a transmission is determined according to a reference signal resource index, which means that a transmitting or receiving filter parameter of the transmission is the same as a transmitting or receiving filter parameter of a reference signal resource indicated by the reference signal resource index. The transmission includes one of PUSCH transmission, PUCCH transmission or SRS transmission. A spatial relation is essentially indicated by using a reference signal. That is, the spatial relation index may be a reference signal index.

The beam or the transmitting mode or the receiving mode of the transmission is determined by using the reference signal resource index, which means that a demodulation reference signal of the transmission has the same quasi co-location parameter as a reference signal indicated by the reference signal resource index. The quasi co-location parameter includes at least one of the following: Doppler spread, Doppler translation, delay spread, average delay, average gain or a spatial parameter. The spatial parameter includes a spatial receiving parameter such as an angle of arrival, spatial correlation of a receiving beam, correlation between average delay and a time-frequency channel response (including phase information). The transmission includes one of physical downlink shared channel (PDSCH) transmission, physical downlink control channel (PDCCH) transmission or CSI-RS transmission.

The reference signal includes at least one of the following: a channel state information reference signal (CSI-RS), a channel state information interference measurement signal (CSI-IM), a demodulation reference signal (DMRS), a downlink demodulation reference signal (DL DMRS), an uplink demodulation reference signal (UL DMRS), a sounding reference signal (SRS), a phase-tracking reference signal (PTRS), a random access channel (RACH) signal, a synchronization signal (SS), a synchronization signal block (SSB), a primary synchronization signal (PSS) or a secondary synchronization signal (SSS).

The reference signal may be configured by higher layer signaling, for example, radio resources control (RRC) signaling. For example, reference signals each in a downlink direction (DL) are the SSB and the CSI-RS, and a reference signal in an uplink direction (UL) is the SRS. The base station schedules DL transmission such as PDSCH, PDCCH or CSI-RS transmission, and a beam direction or a receiving mode of the scheduled transmission is indicated to the UE by using a reference signal. Then, the scheduled transmission has the same quasi co-location parameter as the indicated reference signal. The base station schedules UL transmission such as PUSCH, PUCCH or SRS transmission, and a beam direction or a transmitting mode of the scheduled transmission is indicated to the UE by using a reference signal. Then, the scheduled transmission has the same filter parameter, or the same quasi co-location parameter as the indicated reference signal.

A description is given below using an example of UL transmission.

A base station configures at least one SRS resource for a UE. SRS resources are distinguished by SRS resource identifiers (IDs) (indexes or serial numbers). The base station further configures at least one SRS resource set for the UE. SRS resource sets are distinguished by SRS resource set IDs (indexes or serial numbers). At least one SRS resource is included in the SRS resource set. SRS resource sets can be set with usage as: beam management, antenna selection, codebook or non-codebook. An SRS resource set for codebook and an SRS resource set for non-codebook are used for codebook-based PUSCH transmission and non-codebook-based PUSCH transmission, respectively. A spatial relation may be configured in the SRS resource. When the SRS resource is configured with the spatial relation, the UE needs to transmit the SRS resource, that is, determine a transmitting filter parameter, according to the spatial relation of the SRS resource. When the SRS resource is not configured with the spatial relation, the UE determines the transmitting filter parameter by itself. The transmitting filter parameter can be understood as a required transmitting parameter for forming a specific beam direction.

A description is given below using an example where both a base station (gNB) and a UE support multiple beams. Generally, both an uplink and a downlink need beam training (also referred to as beam scanning or beam management). The base station firstly configures an SRS resource set for beam management for the UE. A spatial relation is not configured in an SRS resource, and the UE determines a transmitting filter parameter for the SRS resource by itself. Then, according to a result of beam training, the base station selects some relatively-good beam pairs as available/alternative beam pairs to configure an SRS resource set for codebook or non-codebook for the UE. The SRS resource set includes at least one SRS resource. A spatial relation of the SRS resource is expressed by an SRS resource that has been sent by the UE, or a downlink reference signal indicator (including a reference signal resource index) or an SSB indicator (including an SSB index) that has been sent by the base station. Each of the at least one SRS resource corresponds to a respective one of at least one available/alternative beam pairs.

Figures 2, 3:
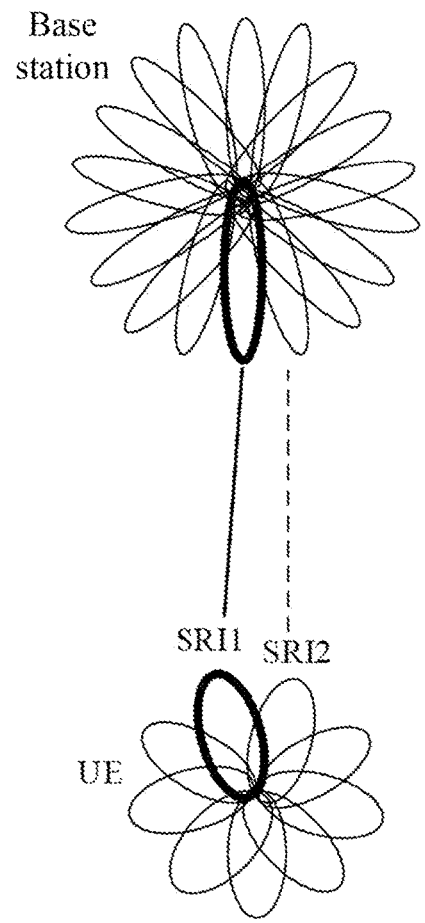
FIG. 2 is a schematic diagram illustrating that a base station and a UE select beams from trained beams to perform transmission according to an embodiment of the present application.
FIG. 3 is a flowchart of a transmitting parameter determination process according to an embodiment of the present application.

For PUSCH transmission, the base station indicates one or more SRS resources through an SRS resource indicator (SRI) field in downlink control information (DCI). That is, the SRI may indicate multiple SRS resource IDs. Then, the UE transmits a PUSCH by using the same transmitting filter parameter as an SRS resource corresponding to the SRI, which may be understood as by using the same beam. The SRI indicated in the DCI is determined according to the SRS resource set configured by the base station. An SRS resource in SRS resource sets for codebook and non-codebook may be used as a reference for the PUSCH transmission. FIG. 2 is a schematic diagram illustrating that a base station and a UE select beams from trained beams to perform transmission according to an embodiment of the present application. FIG. 1 is a schematic diagram of a trained beam relation between a base station and a UE according to an embodiment of the present application. As shown in FIG. 1, an SRS resource set includes two SRS resources marked SRI1 and SRI2. As shown in FIG. 2, an SRI field in DCI scheduling a PUSCH indicates SRI1, and then, the UE uses a spatial relation of an SRS resource corresponding to SRI1 to determine a transmitting filter parameter of the PUSCH. For PUCCH transmission, a beam is expressed by a spatial relation corresponding to a PUCCH resource.

For uplink transmission, the base station further needs to configure a power control parameter for the UE. For PUSCH transmission, a power control parameter has an association relation with an SRI of a PUSCH. For PUCCH transmission, a power control parameter has an association relation with a spatial relation of a PUCCH.

An available beam pair between the base station and the UE may change as the position of the UE changes. The SRS resource set, the spatial relation corresponding to the SRS resource, and the correspondence between the value of the SRI field in the DCI and the power control parameter are all configured by high layer signaling, for example, RRC signaling. Generally, the configuration of a high layer parameter has large delay and not high flexibility. Therefore, in related technology, it is supported that the spatial relation of the SRS resource is modified for the SRS resource set by using an MAC CE. Additionally, the MAC CE is also supported in modifying the power control parameter of the uplink transmission. An MAC layer is lower than an RRC layer and higher than a physical layer. The time domain and the flexibility of the MAC layer is between those of the RRC layer and the physical layer, and the sensitivity to overhead of the MAC layer is also between those of the RRC layer and the physical layer.

In related technology, the transmitting parameter of the uplink transmission is updated by using the MAC CE, and there are problems described below.

A relation between a PUCCH group, PL_ref_linking (the value of high layer parameter pathlossReferenceLinking) and a CC group for updating a spatial relation is not clear. A relation between an SRS resource ID, an SRS resource set ID and a CC group for updating a spatial relation of SRS is not clear. A power control parameter pool is independently configured for each-type uplink transmission on each BWP of each CC by using RRC signaling, resulting in too much overhead. Generally, the mechanism for determining a transmitting parameter of uplink transmission by using MAC CE in the related technology is still not perfect.

At least one CC is included in a carrier aggregation (CA) or dual connectivity (DC) scenario. The CC may be referred to as a serving cell or a cell carrier. One CC may include at least one uplink carrier, such as a UL carrier and an SUL carrier, representing an uplink carrier and a supplemental uplink carrier, respectively. One uplink carrier or supplementary uplink carrier includes at least one bandwidth part (BWP). PUSCH transmission, PUCCH transmission and SRS transmission are performed in an uplink BWP and may occupy a part or all of frequency domain resources of the uplink BWP.

To save the overhead of the MAC CE, in the embodiment of the present application, a spatial relation of an uplink channel (the PUCCH or the PUSCH) or a signal (the SRS) may be updated for a CC group by using the MAC CE.

To solve the preceding problems, in an exemplary implementation, an embodiment of the present application provides a transmitting parameter determination method applied to a first node device. FIG. 3 is a flowchart of a transmitting parameter determination process according to an embodiment of the present application. The method may be applied to the case where the first node device determines a transmitting parameter of uplink transmission. The first node device may be a terminal device or the like. Accordingly, as shown in FIG. 3, the transmitting parameter determination method provided in the present application includes step S110.

In step S110, a CC group and a transmitting parameter of uplink transmission of a CC in the CC group are determined according to an MAC CE.

The transmitting parameter of the uplink transmission includes spatial relation information and/or power control parameter information. The uplink transmission includes at least one of SRS transmission, PUSCH transmission or PUCCH transmission.

In the embodiment of the present application, the first node device may receive the MAC CE sent by a second node device, and determine the CC group and the transmitting parameter of the uplink transmission of the CC in the CC group according to the received MAC CE. The uplink transmission of the CC in the CC group refers to uplink transmissions of all BWPs or activated BWPs of the CC in the CC group.

The uplink transmission of the CC in the CC group refers to the situation where there is specified-type transmission on each CC. Assuming that the CC group includes CC1, CC2 and CC3, where PUSCH, PUCCH and SRS transmissions are configured on CC1, and PUSCH and SRS transmissions are configured on CC2, the MAC CE is applied to a PUCCH of CC1 in the CC group when specified uplink transmission is PUCCH transmission, and the MAC CE is applied to PUSCH transmissions of CC1, CC2 and CC3 in the CC group when the specified uplink transmission is PUSCH transmission.

According to the embodiment of the present application, the CC group and the transmitting parameter of the uplink transmission, including the spatial relation information and/or the power control parameter information, of each CC in the CC group are determined according to the MAC CE. This solves the problem that the mechanism for determining a transmitting parameter of uplink transmission is not perfect, and optimizes the mechanism for determining a transmitting parameter of uplink transmission.

On the basis of the preceding embodiment, a variant embodiment of the preceding embodiment is proposed. For the brevity of description, only differences from the preceding embodiment are described in the variant embodiment.

In an example, the step in which the CC group is determined according to the MAC CE may include that: a CC group to which the MAC CE is applied is determined according to a CC group ID included in the MAC CE, according to a CC group to which a cell ID included in the MAC CE belongs, or according to a CC group to which a cell carrying the MAC CE belongs.

In the embodiment of the present application, a carrier component (or referred to as the component carrier, a serving cell or a cell) included in the CC group may be pre-configured. One cell belongs to only one CC group. That is, different CC groups cannot have the same cell.

In an example, the CC group has at least one of the features described below:

the CC group includes at least one CC; an SRS is configured on each CC in the CC group; SRS resources in the CC group which have the same SRS resource ID are associated with the same spatial relation (that is, the same spatial relation associated with the SRS resources is the same reference signal or the same SSB); reference signals or SSBs of spatial relations associated with SRS resources in the CC group which have the same SRS resource ID have a quasi co-location (QCL) relation; reference signals or SSBs of spatial relations associated with SRS resources in the CC group which have the same SRS resource ID have the same QCL parameter of type D; the CC group includes a spatial relation CC group and/or a power control parameter CC group; the CC group is configured by a high layer parameter; the CC group is determined by a pathloss reference linking parameter; the CC group is a subset of a first-type CC group determined by a pathloss reference linking parameter; the CC group is the same as a first-type CC group determined by a pathloss reference linking parameter; the CC group is determined by a PUCCH group; the CC group is a subset of a PUCCH group; the CC group is the same as a PUCCH group; an SRS has an identical CC group to a PUSCH; a spatial relation CC group of an SRS is the same as a power control parameter CC group of the SRS; a spatial relation CC group of a PUSCH is the same as a power control parameter CC group of the PUSCH.

The CC group may be the spatial relation CC group and the power control parameter CC group. The first-type CC group may be a CC group determined by the pathloss reference linking parameter.

In the embodiment of the present application, the PUCCH group may include a primary PUCCH group and a secondary PUCCH group. The primary PUCCH group includes a primary cell (PCell), and 0 or more secondary cells (SCells); PUCCH signaling of each of the above cells is associated with a PUCCH on the PCell. The secondary PUCCH group includes a group of secondary cells; PUCCH signaling of each of these secondary cells is associated with a PUCCH on the PUCCH SCell.

In an optional embodiment of the present application, the spatial relation CC group may be the CC group determined by the pathloss reference linking parameter or a subset of the CC group determined by the pathloss reference linking parameter.

The MAC CE updates a spatial relation of the SRS on the basis of a CC group. The CC group for updating a spatial relation of the SRS by the MAC CE is configured by RRC or determined by a pathloss reference linking parameter (for example, parameter pathlossReferenceLinking). A CC group for updating a spatial relation of PUSCH transmission by the MAC CE is configured by RRC or determined by a pathloss reference linking parameter. Therefore, a CC group for updating a spatial relation of an uplink transmission by the MAC CE is configured by RRC or determined by a pathloss reference linking parameter.

The CC group for updating the spatial relation of uplink transmission by using the MAC CE has at least one of the features described below:

the CC group for the spatial relation is independent of the CC group determined by the pathloss reference linking parameter; the CC group for the spatial relation is the same as the CC group determined by the pathloss reference linking parameter; or the number of CC components in the CC group for the spatial relation is not greater than the number of CC components in the CC group determined by the pathloss reference linking parameter. That is, the CC components of the CC group for the spatial relation cannot belong to different CC groups determined by the pathloss reference linking parameter.

FIG. 4 is a schematic diagram of a relation among a spatial relation, a CC group, and a first-type CC group determined by a pathloss reference linking parameter according to an embodiment of the present application. As shown in FIG. 4, PL_Ref_linking refers to the value of the high layer parameter, that is, the pathloss reference linking parameter. For example, UL CC1 is a primary cell (PCell), and CC1' is a DL CC corresponding to UL CC1; and DL CC2', DL CC3' and DL CC4' are DL CCs corresponding to UL CC2, UL CC3 and UL CC4. It is assumed that UL CC1, UL CC2 and UL CC3 all make reference to a pathloss measurement parameter (a PL-RS) of CC1, and the PL-RS is a downlink RS and transmitted on CC 1'; and UL CC4 refers to a PL-RS of CC4, and the PL-RS of CC4 is sent on CC4'. Thus, there are two CC groups determined by the pathloss reference linking parameter: CC1+CC2+CC3 and CC4. The CC components in the CC group for updating the spatial relation of the uplink transmission by the MAC CE are determined according to the CC group determined by the pathloss reference linking parameter, which may be, as shown in CC group set 1 in FIG. 4, the same as a CC group determined by the pathloss reference linking parameter, or may be a subset of a CC group that is determined by the pathloss reference linking parameter as shown in CC group set 2 in FIG. 4. CC group set 2 includes three CC groups: CC1+CC2, CC3 and CC4.

In the embodiment of the present application, optionally, an SRS, a PUSCH and a PUCCH share a CC group for updating PL-RSs and/or spatial relations. This includes at least one of the cases described below:

a CC group for a spatial relation of an uplink channel or uplink signal is the same as a CC group for a PL-RS of the uplink channel or uplink signal; a CC group for a spatial relation of an uplink channel or uplink signal is a subset of a CC group for a PL-RS of the uplink channel or uplink signal; uplink channels or uplink signals share a CC group for spatial relations; or uplink channels or uplink signals share a CC group for PL-RSs.

The uplink channels or uplink signals sharing the CC group for the spatial relations may be that a part or all of SRS transmission, PUSCH transmission and PUCCH transmission share the CC group for the spatial relations. For example, the SRS transmission has the same CC group for the spatial relation as the PUSCH transmission. Alternatively, the PUSCH transmission has the same CC group for the spatial relation as the PUCCH transmission. Alternatively, the SRS transmission, PUSCH transmission and PUCCH transmission have the same CC group for the spatial relation.

The uplink channels or uplink signals sharing the CC group for the PL-RSs may be that a part or all of SRS transmission, PUSCH transmission and PUCCH transmission share the CC group for pathloss measurement parameters. For example, the SRS transmission has the same CC group for the pathloss measurement parameter as the PUSCH transmission. Alternatively, the PUSCH transmission has the same CC group for the pathloss measurement parameter as the PUCCH transmission. Alternatively, the SRS transmission, PUSCH transmission and PUCCH transmission have the same CC group for the pathloss measurement parameter. That is, the MAC CE may update the PL-RS on the basis of the CC group.

In an example, the MAC CE may include at least one of a CC group ID, a cell ID, a cell ID of an SRS resource set, a bandwidth part (BWP) ID of an SRS resource set, an SRS resource set ID, at least one SRS resource ID, spatial relation related information of an SRS resource, power control parameter related information of an SRS resource or an SRS resource set, a cell ID of a PUSCH, a BWP ID of a PUSCH, an SRS resource indicator (SRI) of a PUSCH, or power control parameter related information of an SRI. The spatial relation related information includes at least one of: at least one piece of spatial relation information, a CC ID of spatial relation information, or a BWP ID of spatial relation information. The power control parameter related information includes at least one of: a power control parameter, a CC ID of a power control parameter, or a BWP ID of a power control parameter.

The power control parameter includes at least one of an open-loop power control parameter, a closed-loop power control parameter or a pathloss measurement parameter. The open-loop power control parameter includes at least one of an ID of the open-loop power control parameter, a target receive power PO or a pathloss compensation coefficient alpha. The closed-loop power control parameter includes the number of closed-loop power controls, for example, 2, indicating that there are 2 closed-loop power controls, or 2 closed-loop power control loops. The pathloss measurement parameter refers to a resource ID of a pathloss measurement reference signal, which is also written as a PL-RS. The pathloss measurement reference signal may be a CSI-RS or an SSB.

In the embodiment of the present application, a serial number, an index and an ID have the same meaning and may be interchanged. A cell ID and a CC ID have the same meaning and may be interchanged.

In an embodiment, the SRS resource set is configured on the basis of a CC/BWP. The number of SRS resource sets and the number of resources in the SRS resource set on each CC/BWP may be different. When the spatial relation of the SRS is updated on the basis of the CC group, the MAC CE includes at least one of the following pieces of information:

a CC group ID, a CC ID of an SRS resource set whose spatial relation is to be updated, a BWP ID of an SRS resource set whose spatial relation is to be updated, an SRS resource set ID of an SRS resource whose spatial relation is to be updated, an SRS resource ID of an SRS resource whose spatial relation is to be updated, spatial relation related information of an SRS resource, or pathloss measurement related information of an SRS resource or an SRS resource set.

The spatial relation related information of the SRS resource includes at least one of the following: at least one piece of spatial relation information, a CC ID of spatial relation information, or a BWP ID of spatial relation information.

In an optional embodiment of the present application, resources in corresponding SRS resource sets on all CCs in the CC group have identical, or partially identical spatial relations. The CC group for the spatial relation of the SRS has at least one of the features described below:

at least one CC is included; an SRS is configured on each CC; or SRS resources of CCs in the same CC group which have the same SRS resource ID have an identical spatial relation.

In an example, the MAC CE may include one or more SRS resource IDs and spatial relations corresponding to the one or more SRS resource IDs, for updating spatial relations of SRS resources corresponding to SRS resource IDs of all CCs in the CC group. The CC group is configured in view of the SRS resource ID or the SRS. A respective spatial relation corresponding to each SRS resource ID is used for updating SRS resources corresponding to all CCs in a CC group of the each SRS resource ID.

In another example, the MAC CE may include a CC group ID, and one or more SRS resource IDs and one or more spatial relations corresponding to the one or more SRS resource IDs, for updating spatial relations of SRS resources corresponding to SRS resource IDs of all CCs in the CC group identified by the CC group ID. The CC group is configured in view of the SRS resource ID or the SRS.

In another example, the MAC CE may include a CC index, a BWP index, an SRS resource set ID, spatial relations corresponding to all SRS resources in an SRS resource set identified by the SRS resource set ID, for updating a spatial relation of an SRS resource, which is in accordance with an SRS resource ID contained the SRS resource set, of each CC in the CC group. The CC group is configured in view of the SRS resource ID or the SRS. When the CC group is configured in view of the SRS, one CC belongs to one CC group at most.

The UE may determine, in one of the manners described below, the CC group to which the MAC CE for updating the spatial relation of the SRS is applied:

the CC group is determined according to the CC group ID contained in the MAC CE for updating the spatial relation of the SRS, or the CC group is configured in view of the SRS, where the CC group to which the MAC CE is applied refers to a CC group containing a UL CC corresponding to a DL CC carrying the MAC CE.

The UE may determine, in one of the manners described below, an SRS resource to which the MAC CE for updating the spatial relation of the SRS is applied:

the SRS resource to which the MAC CE for updating the spatial relation of the SRS is determined according to the SRS resource ID included in the MAC CE for updating the spatial relation of the SRS, or all SRS resources included in the SRS resource set determined according to the SRS resource set ID included in the MAC CE for updating the spatial relation of the SRS are SRS resources to which the MAC CE for updating the spatial relation of the SRS is applied.

The SRS resource set refers to an SRS resource set in the cell index and the BWP index which are included in the MAC CE for updating the spatial relation of the SRS. Alternatively, the SRS resource set refers to an SRS resource set on an activated BWP in a CC of the cell index contained in the MAC CE for updating the spatial relation of the SRS. Alternatively, the SRS resource set refers to an SRS resource set on an activated BWP in a UL CC corresponding to a DL CC carrying the MAC CE for updating the spatial relation of the SRS.

An SRS resource that is contained in another SRS resource set in the same CC group as the determined SRS resource set described above and has an SRS resource ID as same as an ID of an SRS resource in the determined SRS resource set is also an SRS resource to which the MAC CE for updating the spatial relation of the SRS is applied.

An SRS resource that is included in another SRS resource set in the same CC group as the determined SRS resource set described above, has the same usage as the determined SRS resource set described above, and has an SRS resource ID as same as an ID of an SRS resource in the determined SRS resource set is also an SRS resource to which the MAC CE for updating the spatial relation of the SRS is applied.

In an optional embodiment of the present application, one group of CCs of RRC parameter configuration and a pathloss reference linking parameter of a PL-RS share one set of PL-RS parameter pool of the SRS. The SRS, the PUSCH and the PUCCH may share one set of PL-RS parameter pool.

After the spatial relation of the uplink channel (the PUCCH or the PUSCH) or signal (the SRS) is updated, the PL-RS may need to be updated.

The base station configures a pathloss measurement parameter pool for the UE through RRC. This may include at least one of the manners described below.

A pathloss measurement parameter pool of an SRS is configured for each CC or BWP that configures with an SRS. A shared pathloss measurement parameter pool of an SRS is configured for multiple CCs each configured with an SRS, where the multiple CCs make reference to an RS of the same CC to measure pathloss. An SRS and a PUSCH share a pathloss measurement parameter pool. An SRS and a PUCCH share a pathloss measurement parameter pool. A PUSCH and a PUCCH share a pathloss measurement parameter pool. An SRS, a PUSCH and a PUCCH share a pathloss measurement parameter pool. In the CC group, an SRS, a PUSCH and a PUCCH share a pathloss measurement parameter pool. The CC group includes multiple CCs referring to an RS of the same CC to measure pathloss.

In an optional embodiment of the present application, the MAC CE may update a PL-RS of the SRS of the CC group. The configuration of a CC group for the updating the PL-RS of the SRS is identical with the configuration of the CC group for the spatial relation of the SRS. Alternatively, a CC group for updating the PL-RS of the SRS is configured for a pathloss parameter of the SRS.

The base station transmits an MAC CE to the UE, for updating a power control parameter of the SRS of the UE.

The MAC CE for updating the power control parameter of the SRS may include at least one of the following:

a CC group ID, a CC ID of an SRS resource set whose pathloss measurement parameter is to be updated, a BWP ID of an SRS resource set whose pathloss measurement parameter is to be updated, an SRS resource set ID whose pathloss measurement parameter is to be updated, one or more SRS resource IDs, or pathloss measurement related information of an SRS resource or an SRS resource set.

The pathloss measurement related information includes at least one of the following: pathloss measurement information, a CC ID of pathloss measurement information, or a BWP ID of pathloss measurement information.

In an example, the MAC CE may include a CC index, a BWP index, an SRS resource set ID, and pathloss measurement related information of an SRS resource set identified by the SRS resource set ID, for updating a pathloss measurement parameter of a SRS resource set, which is in accordance with a SRS resource ID contained in the SRS resource set, of each CC in the CC group.

In an example, the MAC CE includes one or more SRS resource IDs, and pathloss measurement related information of an SRS resource set. The pathloss measurement related information of the SRS resource set is used for updating a PL-RS of an SRS resource set, which contains the one or more SRS resource IDs, of each CC in the CC group.

In an optional embodiment of the present application, when the CC group is configured in view of the SRS, one CC belongs to one CC group at most. Accordingly, the UE may determine, in one of the manners described below, the CC group to which the MAC CE for updating the power control parameter of the SRS is applied.

The CC group is determined according to the CC group ID contained in the MAC CE for updating the spatial relation of the SRS. Alternatively, the CC group is configured in view of the SRS. The CC group to which the MAC CE is applied refers to the CC group containing the UL CC corresponding to the DL CC carrying the MAC CE.

In an optional embodiment of the present application, the MAC CE may update a PL-RS of a PUSCH of the CC group. The configuration of a CC group for updating the PL-RS of the PUSCH is identical with the configuration of the CC group for updating the spatial relation of the SRS. Alternatively, a CC group for updating the PL-RS of the PUSCH is configured in view of the PUSCH. Alternatively, a CC group for updating the PL-RS of the PUSCH is identical with a CC group for updating a PL-RS of a PUCCH.

The base station transmits the MAC CE to the UE, for updating the power control parameter of the SRS of the UE. An MAC CE for updating a power control parameter of the PUSCH may include at least one of the following:

a CC group ID, a CC ID of a PUSCH whose pathloss measurement parameter is to be updated, a BWP ID of a PUSCH whose pathloss measurement parameter is to be updated, an SRI of a PUSCH whose pathloss measurement parameter is to be updated, or pathloss measurement related information of an SRI.

The pathloss measurement related information includes at least one of the following: pathloss measurement information, a CC ID of pathloss measurement information, or a BWP ID of pathloss measurement information.

The SRS resource indicator (SRI) refers to an SRS resource indicator in an SRS resource set associated with the PUSCH.

In the embodiment of the present application, the transmitting parameter of the uplink transmission may be updated, in three manners, according to the SRS resource set or the SRS resource to which the MAC CE is applied.

In an example, the step in which the CC group and the transmitting parameter of the uplink transmission of each CC in the CC group are determined according to the MAC CE may include that: a first SRS resource set to which the MAC CE is applied is determined, and power control parameter information is updated according to the first SRS resource set.

In an example, the step in which the CC group and the transmitting parameter of the uplink transmission of each CC in the CC group are determined according to the MAC CE may include that: a first SRS resource set to which the MAC CE is applied is determined, a second SRS resource set to which the MAC CE is applied is determined according to the first SRS resource set, and power control parameter information is updated according to the first SRS resource set and/or the second SRS resource set.

Exemplarily, the power control parameter information is updated according to the first SRS resource set, where the power control parameter information may include an SRS power control parameter association ID and/or an SRS power control parameter ID.

When the MAC CE activates or updates the power control parameter of the SRS, for example, an ID of pathloss measurement parameter, the ID of pathloss measurement parameter is used for the same SRS resource set ID of all BWPs in the CC group to which the MAC CE is applied. The ID of pathloss measurement parameter corresponds to an ID in a respective pathloss measurement parameter pools defined for each CC or each BWP.

When the MAC CE activates or updates the power control parameter of the SRS, for example, an ID of pathloss measurement parameter, a PL-RS is obtained in a specified CC according to the ID of pathloss measurement parameter, and the ID of pathloss measurement parameter is used for the same SRS resource set ID of all BWPs in the CC group to which the MAC CE is applied.

The first SRS resource set and the second SRS resource set may be two different SRS resource sets to which the MAC CE is applied.

In an example, the step in which the CC group and the transmitting parameter of the uplink transmission of each CC in the CC group are determined according to the MAC CE may include that: an SRS resource to which the MAC CE is applied is determined, and the spatial relation information is updated according to the SRS resource to which the MAC CE is applied.

In an example, the step in which the first SRS resource set to which the MAC CE is applied may include that: the first SRS resource set to which the MAC CE is applied is determined according to the SRS resource set ID, the cell ID of the SRS resource set, and the bandwidth part (BWP) ID of the SRS resource set which are contained in the MAC CE; the first SRS resource set is determined according to the SRS resource set ID and the cell ID of the SRS resource set which are contained in the MAC CE, and an activated BWP in a cell identified by the cell ID of the SRS resource set; the first SRS resource set is determined according to the SRS resource set ID contained in the MAC CE, and an activated BWP in the cell carrying the MAC CE; or the first SRS resource set is determined according to at least one SRS resource ID included in the MAC CE.

In an example, the step in which the first SRS resource set is determined according to the at least one SRS resource ID included in the MAC CE may include that: an SRS resource set that is in accordance with the at least one SRS resource ID included in the MAC CE is used as the first SRS resource set, or an SRS resource set that is in accordance with K1 SRS resource ID(s) in the at least one SRS resource ID included in the MAC CE is used as the first SRS resource set. K1 is a predefined or pre-configured integer greater than or equal to 1, or determined according to a predefined or pre-configured percentage.

The K1 SRS resource IDs may be K1 SRS resource IDs having minimum IDs in the SRS resource set. Alternatively, the K1 SRS resource IDs may be K1 SRS resource IDs having maximum IDs in the SRS resource set.

K1 is the pre-configured integer greater than or equal to 1. K1 may be determined according to a predefined or pre-configured percentage. For example, the SRS resource set includes 4 SRS resources, and when the predefined percentage is 50%, K1=4*50%=2.

In an example, the step in which the second SRS resource set to which the MAC CE is applied is determined according to the first SRS resource set may include that: an SRS resource set that belongs to a CC in the same CC group as the first SRS resource set and has identical SRS resources with the first SRS resource set is used as the second SRS resource set to which the MAC CE is applied; an SRS resource set that belongs to a CC in the same CC group as the first SRS resource set and has the same SRS resource set ID as the first SRS resource set is used as the second SRS resource set to which the MAC CE is applied; or an SRS resource set that belongs to a CC in the same CC group as the first SRS resource set and is in accordance with at least K2 SRS resource ID(s) in SRS resources of the first SRS resource set is used as the second SRS resource set to which the MAC CE is applied. K2 is a predefined or pre-configured integer greater than or equal to 1, or determined according to a predefined or pre-configured percentage.

The K2 SRS resource IDs may be K2 SRS resource IDs having minimum IDs in the SRS resource set. Alternatively, the K2 SRS resource IDs may be K2 SRS resource IDs having maximum IDs in the SRS resource set.

In an example, the UE may determine, in one of the manners described below, the SRS resource set to which the MAC CE for updating the power control parameter of the SRS is applied.

The SRS resource set to which the MAC CE for updating the power control parameter of the SRS is applied is determined according to the SRS resource set ID included in the MAC CE for updating the power control parameter of the SRS. An SRS resource set that belongs to a CC in the same CC group as the CC index included in the MAC CE for updating the power control parameter of the SRS and is in complete accordance with SRS resources in an SRS resource set determined according to the SRS resource set ID is the SRS resource set to which the MAC CE for updating the power control parameter of the SRS is applied. An SRS resource set that is incomplete accordance with an SRS resource ID included in the MAC CE for updating the power control parameter of the SRS is the SRS resource set to which the MAC CE for updating the power control parameter of the SRS is applied. An SRS resource set that belongs a CC in the same CC group as the CC index included in the MAC CE for updating the power control parameter of the SRS and is in accordance with at least K1 SRS resource IDs in SRS resources of an SRS resource set determined according to the SRS resource set ID is the SRS resource set to which the MAC CE for updating the power control parameter of the SRS is applied. K1 is a pre-configured integer greater than or equal to 1.

An SRS resource set that is in accordance with at least K2 SRS resource ID(s) in SRS resource IDs included in the MAC CE for updating the power control parameter of the SRS is the SRS resource set to which the MAC CE for updating the power control parameter of the SRS is applied. K2 is a pre-configured integer greater than or equal to 1. K2 may be determined according to a predefined or pre-configured percentage. An example is similar to that of K1.

In an example, the step in which the SRS resource to which the MAC CE is applied may include at least one of the following: the SRS resource to which the MAC CE is applied is determined according to the at least one SRS resource ID included in the MAC CE; the SRS resource to which the MAC CE is applied is determined according to an SRS resource included in a first SRS resource set; the SRS resource to which the MAC CE is applied is determined according to an SRS resource included in a second SRS resource set; if an SRS resource ID of an SRS resource included in an SRS resource set that belongs to a CC in the same CC group as the first SRS resource set is the same as an SRS resource ID of an SRS resource in the first SRS resource set, the SRS resource corresponding to the SRS resource ID is the SRS resource to which the MAC CE is applied; when an SRS resource ID of an SRS resource included in an SRS resource set that belongs to a CC in the same CC group as the first SRS resource set and has the same usage as the first SRS resource set is the same as an SRS resource ID of an SRS resource in the first SRS resource set, the SRS resource corresponding to the SRS resource ID is used as the SRS resource to which the MAC CE is applied.

The step in which the SRS resource to which the MAC CE is applied is determined according to the at least one SRS resource ID included in the MAC CE includes that: on all BWPs (or activated BWPs) in all CCs in the CC group to which the MAC CE is applied, SRS resources to which the MAC CE is applied are determined according to the at least one SRS resource ID included in the MAC CE.

In the embodiment of the present application, the transmitting parameter of the uplink transmission may be updated, in three manners, according to an SRI of PUSCH transmission to which the MAC CE is applied.

In an example, the step in which the CC group and the transmitting parameter of the uplink transmission of each CC in the CC group are determined according to the MAC CE may include that: a first SRI of PUSCH transmission to which the MAC CE is applied is determined, and the spatial relation information and/or the power control parameter information is updated according to the first SRI of the PUSCH transmission to which the MAC CE is applied.

In an example, the step in which the CC group and the transmitting parameter of the uplink transmission of each CC in the CC group are determined according to the MAC CE may include that: a first SRI of PUSCH transmission to which the MAC CE is applied is determined, a second SRI of the PUSCH transmission to which the MAC CE is applied is determined, and the spatial relation information and/or the power control parameter information is updated according to the first SRI and/or the second SRI of the PUSCH transmission to which the MAC CE is applied.

The first SRI of the PUSCH transmission and the second SRI of the PUSCH transmission may be SRIs of two different-type PUSCH transmissions to which the MAC CE is applied. The SRIs of the PUSCH transmission refer to that: an SRI of codebook-based PUSCH transmission is the value of an SRI field in DCI corresponding to an SRS resource set used for a codebook, and an SRI of non-codebook-based PUSCH transmission is the value of an SRI field in DCI corresponding to an SRS resource set for a non-codebook.

In an example, the step in which the first SRI of the PUSCH transmission to which the MAC CE is applied is determined may include that: the first SRI of the PUSCH transmission to which the MAC CE is applied is determined according to an SRI of a PUSCH included in the MAC CE; the first SRI of the PUSCH transmission to which the MAC CE is applied is determined according to at least one of the SRS resource ID, the SRS resource set ID or the SRI of the PUSCH, the cell ID of the PUSCH, and the BWP ID of the PUSCH which are included in the MAC CE; the first SRI of the PUSCH transmission to which the MAC CE is applied determined according to at least one of the SRS resource ID, the SRS resource set ID or the SRI of the PUSCH, and the cell ID of the PUSCH which are included in the MAC CE, and an activated BWP in the cell corresponding to the cell ID of the PUSCH; the first SRI of the PUSCH transmission to which the MAC CE is applied is determined according to at least one of the SRS resource ID, the SRS resource set ID or the SRI of the PUSCH which are included in the MAC CE, and an activated BWP in the cell carrying the MAC CE; the first SRI of the PUSCH transmission to which the MAC CE is applied is determined according to at least one of the cell ID of the PUSCH, or the BWP ID of the PUSCH which are included in the MAC CE; the first SRI of the PUSCH transmission to which the MAC CE is applied is determined according to the cell ID of the PUSCH included in the MAC CE, and an activated BWP in the cell corresponding to the cell ID of the PUSCH; or the first SRI of the PUSCH transmission to which the MAC CE is applied is determined according to an activated BWP in the cell carrying the MAC CE. The first SRI may include one or more SRIs.

The first SRI may be determined according to an SRI of at least one PUSCH included in the MAC CE.

The first SRI may be determined according to a BWP ID and a cell ID specified in the MAC CE and the SRS resource set ID included in the MAC CE. That is, the SRI corresponding to the SRS resource set is the first SRI.

The first SRI may be determined according to an SRI included in DCI of a PUSCH corresponding to the cell ID and the BWP ID specified in the MAC CE. That is, an SRI included in a SRS resource set of a BWP and a cell having the same transmission parameter configuration of the PUSCH as the cell ID and the BWP ID specified in the MAC CE is used as the first SRI. The cell ID and the BWP ID specified may be: a cell ID and a BWP ID specified are determined according to at least one of the cell ID of the PUSCH or the BWP ID of the PUSCH included in the MAC CE; a cell ID and a BWP ID specified are determined according to the cell ID of the PUSCH included in the MAC CE, and an activated BWP in the cell corresponding to the cell ID of the PUSCH; or a cell ID and a BWP ID specified are determined according to an activated BWP in the cell carrying the MAC CE.

In an example, the step in which the second SRI of the PUSCH transmission to which the MAC CE is applied is determined may include that: an SRI of a PUSCH which is among SRIs of PUSCHs belonging to a CC in the same CC group as the first SRI of the PUSCH transmission and includes an SRS resource ID which is the same as that included in an SRI of a PUSCH indicated by the MAC CE is used as the second SRI of the PUSCH transmission to which the MAC CE is applied; or an SRI of a PUSCH which is among SRIs of PUSCHs belonging to a CC in the same CC group as the first SRI of the PUSCH transmission and includes at least K3 SRS resource ID(s) that is(are) the same as that(those) included in an SRI of a PUSCH indicated by the MAC CE is used as the second SRI of the PUSCH transmission to which the MAC CE is applied. K3 is a predefined or pre-configured integer greater than or equal to 1, or determined according to a predefined or pre-configured percentage. K3 may be determined according to a predefined or pre-configured percentage. An example is similar to that of K1.

In an example, the MAC CE may include a CC index, a BWP index and pathloss measurement related information, for updating a pathloss measurement parameter of a PUSCH, having an SRS resource ID identical to that included in the SRI, of each CC in the CC group and, or for updating a pathloss measurement parameter of a PUSCH, having at least K3 SRS resource IDs identical to those included in the SRI, of each CC in the CC group and includes. K3 is a pre-configured integer greater than or equal to 1.

Accordingly, the UE may determine, in one of the manners described below, the CC group to which the MAC CE for updating the power control parameter of the PUSCH is applied.

The CC group is determined according to a CC group ID contained in the MAC CE for updating the power control parameter of the PUSCH. Alternatively, the CC group is configured in view of the SRS or the PUSCH. The CC group to which the MAC CE is applied refers to a CC group containing a UL CC corresponding to a DL CC carrying the MAC CE.

The UE may determine, in one of the manners described below, an SRI to which the MAC CE for updating the power control parameter of the PUSCH is applied:

a pathloss measurement parameter of the PUSCH which is in SRIs of PUSCHs of all CCs in the CC group and includes the same SRS resource ID as the SRI indicated by the MAC CE for updating the power control parameter of the PUSCH is determined; or a pathloss measurement parameter of the PUSCH which is in SRIs of PUSCHs of all CCs in the CC group and includes at least K3 SRS resource IDs which are the same as those contained in the SRI indicated by the MAC CE for updating the power control parameter of the PUSCH is determined, where K3 is a pre-configured integer greater than or equal to 1.

In an example, the transmitting parameter determination method may further include: a pathloss measurement parameter pool configured by a high layer is received. The pathloss measurement parameter pool configured by the high layer has at least one of the features describe below.

A CC or a BWP configured with an SRS is independently configured with a pathloss measurement parameter pool of an SRS. More than one CC or BWP configured with an SRS share a pathloss measurement parameter pool of an SRS. More than one CC or BWP configured with an SRS share a pathloss measurement parameter pool of an SRS, where the multiple CCs reference an RS of the same CC to measure pathloss. On the same CC or BWP, or in the same CC group, an SRS and a PUSCH share a pathloss measurement parameter pool. On the same CC or BWP, or in the same CC group, an SRS and a PUCCH share a pathloss measurement parameter pool. On the same CC or BWP, or in the same CC group, a PUSCH and a PUCCH share a pathloss measurement parameter pool. On the same CC or BWP, or in the same CC group, an SRS, a PUSCH and a PUCCH share a pathloss measurement parameter pool.

In an example, the transmitting parameter determination method may further include: a power control parameter pool configured by a high layer is received. The power control parameter pool includes at least one of an open-loop power control parameter pool, a closed-loop power control parameter pool or a pathloss measurement parameter pool. The open-loop power control parameter pool includes at least one open-loop power control parameter element. The open-loop power control parameter element includes at least one of an ID of open-loop power control parameter, a target receive power PO or a pathloss compensation coefficient alpha.

The closed-loop power control parameter pool includes at least one closed-loop power control parameter element. The closed-loop power control parameter element includes a closed-loop power control ID, for identifying a piece of closed-loop power control, or a closed-loop power control loop. The closed-loop power control parameter pool may be indicated by the number of pieces of closed-loop power control. For example, if the closed-loop power control parameter pool includes two pieces of closed-loop power control, then the closed-loop power control ID may be 0 or 1, identifying a first piece of closed-loop power control and a second piece of closed-loop power control, respectively.

The pathloss measurement parameter pool includes at least one pathloss measurement parameter element. The pathloss measurement parameter element includes an ID of pathloss measurement parameter and a pathloss measurement parameter. The pathloss measurement parameter refers to a resource ID of a pathloss measurement reference signal. The pathloss measurement reference signal may be a CSI-RS or an SSB.

In an exemplary implementation, an embodiment of the present application provides a transmitting parameter determination method applied to a second node device. FIG. 5 is a flowchart of a transmitting parameter determination process according to an embodiment of the present application. The method may be applied to the case where the second node device transmits an MAC CE to a first node device so that the first node device determines a transmitting parameter of uplink transmission. The second node device may be a base station device or the like. Accordingly, as shown in FIG. 5, the transmitting parameter determination method provided in the present application includes step S210.

In step S210, an MAC CE is transmitted to a first node device to enable the first node device to determine a CC group and a transmitting parameter of uplink transmission of a CC in the CC group according to the MAC CE.

The transmitting parameter of the uplink transmission includes spatial relation information and/or power control parameter information. The uplink transmission includes at least one piece of SRS transmission, PUSCH transmission or PUCCH transmission.

When the transmitting parameter of the uplink transmission include the power control parameter information, a ID of the determined power control parameter refers a power control parameter corresponding to the ID of the power control parameter in a parameter pool on each CC/BWP, or a power control parameter corresponding to the ID of the power control parameter in a parameter pool on a specified CC/BWP.

In step S220, a pathloss measurement parameter pool configured by a high layer is transmitted.

The pathloss measurement parameter pool configured by the high layer has the features described below.

A CC or a BWP configured with an SRS is independently configured with a pathloss measurement parameter pool of an SRS. More than one CC or BWP configured with an SRS share a pathloss measurement parameter pool of an SRS. More than one CC or BWP configured with an SRS share a pathloss measurement parameter pool of an SRS, where multiple CCs reference an RS of the same CC to measure pathloss. On the same CC or BWP, or in the same CC group, an SRS and a PUSCH share a pathloss measurement parameter pool. On the same CC or BWP, or in the same CC group, an SRS and a PUCCH share a pathloss measurement parameter pool. On the same CC or BWP, or in the same CC group, a PUSCH and a PUCCH share a pathloss measurement parameter pool. On the same CC or BWP, or in the same CC group, an SRS, a PUSCH and a PUCCH share a pathloss measurement parameter pool.

According to the embodiment of the present application, the second node device transmits the MAC CE to the first node device to enable the first node device to determine the CC group and the transmitting parameter of the uplink transmission, including the spatial relation information and/or the power control parameter information, of all the CCs in the CC group according to the MAC CE. This solves the problem that the mechanism for determining a transmitting parameter of uplink transmission is not perfect, and optimizes the mechanism for determining a transmitting parameter of uplink transmission.

On the basis of the preceding embodiment, a variant embodiment of the preceding embodiment is proposed. For the brevity of description, only differences from the preceding embodiment are described in the variant embodiment.

In an example, the first node device is configured to determine, according to a CC group ID included in the MAC CE, according to a CC group to which a cell ID included in the MAC CE belongs, or according to a CC group to which a cell carrying the MAC CE belongs, a CC group to which the MAC CE is applied.

In the embodiment of the present application, a UL CC may be a component of the CC group. A carrier component (or a component carrier) included in the CC group may be pre-configured.

In an example, the CC group has at least one of the features described below.

The CC group includes at least one CC. An SRS is configured on each CC in the CC group. SRS resources in the CC group which have the same SRS resource number are associated with the same spatial relation. The CC group includes a spatial relation CC group and/or a power control parameter CC group. The CC group is configured by a high layer parameter. The CC group is determined by a pathloss reference linking parameter. The CC group is a subset of a first-type CC group determined by a pathloss reference linking parameter. The CC group is the same as a first-type CC group determined by a pathloss reference linking parameter. The CC group is determined by a PUCCH group. The CC group is a subset of a PUCCH group. The CC group is the same as a PUCCH group. An SRS has the same CC group as a PUSCH. A spatial relation CC group of an SRS is the same as a power control parameter CC group of the SRS. A spatial relation CC group of a PUSCH is the same as a power control parameter CC group of the PUSCH.

The CC group may be a spatial relation CC group and a power control parameter CC group. The first-type CC group may be a CC group determined by parameter PL-Ref-linking.

In the embodiment of the present application, the PUCCH group may include a primary PUCCH group and a secondary PUCCH group. The primary PUCCH group includes a primary cell (PCell), and 0 or more secondary cells (SCells); PUCCH signaling of these cells is associated with a PUCCH on the PCell. The secondary PUCCH group includes a group of secondary cells; PUCCH signaling of these secondary cells is associated with a PUCCH on the PUCCH SCell.

In an example, the MAC CE includes at least one of a CC group ID, a cell ID, a cell ID of an SRS resource set, a bandwidth part (BWP) ID of an SRS resource set, an SRS resource set ID, at least one SRS resource ID, spatial relation related information of an SRS resource, power control parameter related information of an SRS resource or an SRS resource set, a cell ID of a PUSCH, a BWP ID of a PUSCH, an SRS resource indicator (SRI) of a PUSCH, or power control parameter related information of an SRI.

The spatial relation related information includes at least one of: at least one piece of spatial relation information, a CC ID of spatial relation information, or a BWP ID of spatial relation information. The power control parameter related information includes at least one of: a power control parameter, a CC ID of a power control parameter, or a BWP ID of a power control parameter.

In the present application, a ID, an index and an ID have the same meaning and may be interchanged. A cell ID and a CC number have the same meaning and may be interchanged.

In an example, the first node device is configured to determine a first SRS resource set to which the MAC CE is applied, and update power control parameter information according to the first SRS resource set.

In an example, the first node device is configured to: determine a first SRS resource set to which the MAC CE is applied, determine, according to the first SRS resource set, a second SRS resource set to which the MAC CE is applied, and update the power control parameter information according to the first SRS resource set and/or the second SRS resource set.

The first SRS resource set and the second SRS resource set may be two different SRS resource sets to which the MAC CE is applied.

In an example, the first node device is configured to: determine an SRS resource to which the MAC CE is applied, and update the spatial relation information according to the SRS resource to which the MAC CE is applied.

In an example, the first node device is configured to: determine, according to an SRS resource set ID, a cell ID of an SRS resource set, and a bandwidth part (BWP) ID of an SRS resource set which are contained in the MAC CE, the first SRS resource set to which the MAC CE is applied; determine the first SRS resource set according to an SRS resource set ID and a cell ID of an SRS resource set which are contained in the MAC CE, and an activated BWP in a cell identified by the cell ID of the SRS resource set; determine the first SRS resource set according to an SRS resource set ID contained in the MAC CE, and an activated BWP in the cell carrying the MAC CE; or determine the first SRS resource set according to at least one SRS resource ID included in the MAC CE.

In an example, the first node device is configured to: use an SRS resource set, which is in accordance with the at least one SRS resource ID included in the MAC CE, as the first SRS resource set; or use an SRS resource set, which is in accordance with K1 SRS resource ID(s) in the at least one SRS resource ID included in the MAC CE, as the first SRS resource set. K1 is a predefined or pre-configured integer greater than or equal to 1, or determined according to a predefined or pre-configured percentage.

The K1 SRS resource IDs may be K1 SRS resource IDs having minimum IDs in the SRS resource set. Alternatively, the K1 SRS resource IDs may be K1 SRS resource IDs having maximum IDs in the SRS resource set.

K is a pre-configured integer greater than or equal to 1. K may be determined according to a predefined or pre-configured percentage. For example, the SRS resource set includes 4 SRS resources, and when the predefined percentage is 50%, K=4*50%=2.

In an example, the first node device is configured to: use an SRS resource set, which belongs to a CC in the same CC group as the first SRS resource set and has identical SRS resources with the first SRS resource set, as the second SRS resource set to which the MAC CE is applied; use an SRS resource set, which belongs to a CC in the same CC group as the first SRS resource set and has the same SRS resource set ID as the first SRS resource set, as the second SRS resource set to which the MAC CE is applied; or use an SRS resource set, which belongs to a CC in the same CC group as the first SRS resource set and is in accordance with at least K2 SRS resource IDs of SRS resources in the first SRS resource set, as the second SRS resource set to which the MAC CE is applied. K2 is a predefined or pre-configured integer greater than or equal to 1, or determined according to a predefined or pre-configured percentage.

The K2 SRS resource IDs may be K2 SRS resource IDs having minimum IDs in the SRS resource set. Alternatively, the K2 SRS resource IDs may be K2 SRS resource IDs having maximum IDs in the SRS resource set.

In an example, the first node device is configured to: determine, according to at least one SRS resource ID included in the MAC CE, the SRS resource to which the MAC CE is applied; determine, according to an SRS resource included in the first SRS resource set, the SRS resource to which the MAC CE is applied; determine, according to an SRS resource included in the second SRS resource set, the SRS resource to which the MAC CE is applied; if an SRS resource ID of an SRS resource included in an SRS resource set that belongs to a CC in the same CC group as the first SRS resource set is the same as an SRS resource ID of an SRS resource in the first SRS resource set, use the SRS resource corresponding to the SRS resource ID as the SRS resource to which the MAC CE is applied; or when an SRS resource ID of an SRS resource included in an SRS resource set that belongs to a CC in the same CC group as the first SRS resource set and has the same usage as the first SRS resource set is the same as an SRS resource ID of an SRS resource in the first SRS resource set, use the SRS resource corresponding to the SRS resource ID as the SRS resource to which the MAC CE is applied.

In the embodiment of the present application, the first node device may update, in three manners, the transmitting parameter of the uplink transmission according to an SRI of PUSCH transmission to which the MAC CE is applied.

In an example, the first node device is configured to: determine a first SRI of PUSCH transmission to which the MAC CE is applied, and update the spatial relation information and/or the power control parameter information according to the first SRI of the PUSCH transmission to which the MAC CE is applied.

In an example, the first node device is configured to: determine a first SRI of PUSCH transmission to which the MAC CE is applied, determine a second SRI of the PUSCH transmission to which the MAC CE is applied, and update the spatial relation information and/or the power control parameter information according to the first SRI and/or the second SRI of the PUSCH transmission to which the MAC CE is applied.

The first SRI of the PUSCH transmission and the second SRI of the PUSCH transmission may be SRIs of two different-type PUSCH transmissions to which the MAC CE is applied.

In an example, the first node device is configured to: determine, according to an SRI of a PUSCH included in the MAC CE, the first SRI of the PUSCH transmission to which the MAC CE is applied; determine, according to at least one of an SRS resource ID, an SRS resource set ID or an SRI of a PUSCH, a cell ID of a PUSCH, and a BWP ID of a PUSCH which are included in the MAC CE, the first SRI of the PUSCH transmission to which the MAC CE is applied; determine, according to at least one of an SRS resource ID, an SRS resource set ID or an SRI of a PUSCH, and a cell ID of a PUSCH which are included in the MAC CE, and the activated BWP in the cell corresponding to the cell ID of the PUSCH, the first SRI of the PUSCH transmission to which the MAC CE is applied; determine, according to at least one of an SRS resource ID, an SRS resource set ID or an SRI of a PUSCH which are included in the MAC CE, and the activated BWP in the cell carrying the MAC CE, the first SRI of the PUSCH transmission to which the MAC CE is applied; determine, according to at least one of a cell ID of a PUSCH, or a BWP ID of a PUSCH which are included in the MAC CE, the first SRI of the PUSCH transmission to which the MAC CE is applied; determine, according to a cell ID of a PUSCH included in the MAC CE, and the activated BWP in the cell corresponding to the cell ID of the PUSCH, the first SRI of the PUSCH transmission to which the MAC CE is applied; or determine, according to the activated BWP in the cell carrying the MAC CE, the first SRI of the PUSCH transmission to which the MAC CE is applied.

In an example, the step in which the second SRI of the PUSCH transmission to which the MAC CE is applied is determined may include that: an SRI of a PUSCH which is among SRIs of PUSCHs belonging to a CC in the same CC group as the first SRI of the PUSCH transmission and includes an SRS resource ID which is the same as that included in an SRI of a PUSCH indicated by the MAC CE is used as the second SRI of the PUSCH transmission to which the MAC CE is applied; or an SRI of a PUSCH which is among SRIs of PUSCHs belonging to a CC in the same CC group as the first SRI of the PUSCH transmission and includes at least K3 SRS resource ID(s) that is(are) the same as that(those) included in an SRI of a PUSCH indicated by the MAC CE is used as the second SRI of the PUSCH transmission to which the MAC CE is applied. K3 is a predefined or pre-configured integer greater than or equal to 1, or determined according to a predefined or pre-configured percentage.

In an example, the transmitting parameter determination method may further include: a power control parameter pool configured by a high layer is sent. The power control parameter pool includes at least one of an open-loop power control parameter pool, a closed-loop power control parameter pool or a pathloss measurement parameter pool. The open-loop power control parameter pool includes at least one open-loop power control parameter element. The open-loop power control parameter element includes at least one of an ID of open-loop power control parameter, a target receive power PO or a pathloss compensation coefficient alpha.

The closed-loop power control parameter pool includes at least one closed-loop power control parameter element. The closed-loop power control parameter element includes a closed-loop power control ID, for identifying a piece of closed-loop power control, or a closed-loop power control loop. The closed-loop power control parameter pool may be indicated by the number of pieces of closed-loop power control. For example, if the closed-loop power control parameter pool includes two pieces of closed-loop power control, then the closed-loop power control ID may be 0 or 1, identifying a first piece of closed-loop power control and a second piece of closed-loop power control, respectively.

The pathloss measurement parameter pool includes at least one pathloss measurement parameter element. The pathloss measurement parameter element includes an ID of pathloss measurement parameter and a pathloss measurement parameter. The pathloss measurement parameter refers to a resource ID of a pathloss measurement reference signal. The pathloss measurement reference signal may be a CSI-RS or an SSB.

A power control parameter of PUSCH transmission among transmitting parameters of uplink transmission are acquired in the manners described below.

(1) A base station configures a power control parameter pool for a UE through high layer signaling. The power control parameter pool includes at least one of the following: an open-loop power control parameter pool, a closed-loop power control parameter pool and a pathloss measurement parameter pool. A parameter pool of each type includes at least one parameter corresponding to the each type.

(2) The base station configures an SRS resource set for a UE through high layer signaling. The base station indicates one or more SRS resources in the SRS resource set by using an SRI, for reference of PUSCH transmission.

(3) A base station configures, for a UE, an association relation between the value of an SRI field in DCI and an each-type power control parameter in of a power control parameter pool (hereinafter referred to as an association between an SRI and a power control parameter) through high layer signaling. Additionally, the base station may update or modify the association between the SRI and the power control parameter through an MAC CE.

(4) A base station schedules or activates, through physical layer control information, for example, DCI, a UE to transmit PUSCH transmission. The DCI includes an SRI field, for indicating an SRS resources referred to by a PUSCH. Alternatively, a base station configures, through high layer signaling, a UE to transmit PUSCH transmission, and indicates, through high layer signaling including an SRI, an SRS resource referenced by a PUSCH. PUSCH transmission scheduled by the DCI is referred to as dynamically authorized PUSCH transmission. PUSCH transmission configured by a high layer is referred to as type-1 configuration authorized PUSCH transmission. PUSCH transmission activated by the DCI is referred to as type-2 configuration authorized PUSCH transmission.

The UE receives power control parameter information of the PUSCH transmission described above, and different-type PUSCH transmission is processed in manners described below.

For the dynamically authorized PUSCH transmission, a power control parameter corresponding to the PUSCH transmission is acquired through an SRI value in the DCI, and the association relation between the value of the SRI field and the each-type power control parameter in the power control parameter pool.

For the type-1 configuration authorized PUSCH transmission, a power control parameter of the PUSCH transmission is directly acquired through high layer signaling.

For the type-2 configuration authorized PUSCH transmission, an open-loop power control parameter and a closed-loop power control parameter of the PUSCH transmission are directly acquired through high layer signaling, while a pathloss measurement parameter is acquired through an SRI value in the DCI activating the PUSCH transmission, and an association relation between the value of the SRI field and a pathloss measurement parameter pool among power control parameter pools.

From the preceding description, it may be seen that the acquisition of the power control parameters of the dynamically authorized PUSCH transmission and the type-2 configuration authorized PUSCH transmission is related to the SRI and the association information between the SRI field and the PUSCH power control parameter. Thus, in some scenarios, the UE may not be able to acquire the SRI. For example, the type-2 configuration authorized PUSCH transmission and the dynamically authorized PUSCH transmission may be scheduled or activated by using DCI format 0_0 or 0_1. DCI format 0_0 does include an SRI field. When an SRS resource set corresponding to PUSCH transmission includes only one SRS resource, DCI format 0_1 does not include the SRI field.

For the dynamically authorized PUSCH transmission, when the UE cannot acquire the SRI or the association information between the SRI and the PUSCH power control parameter, the open-loop power control parameter and the closed-loop power control parameter are processed in the manner of using power control parameters having the minimum IDs in the open-loop and closed-loop power control parameter pools among power control parameter pools, for example, the first open-loop power control parameter (numbered 0) configured in the open-loop power control parameter pool. The pathloss measurement parameter is processed in the following manner: when a spatial parameter of the PUCCH may be acquired, the UE acquires the pathloss measurement parameter through a spatial relation associated with a PUCCH resource having the minimum number; and when the spatial parameter of the PUCCH cannot be acquired, a power control parameter having the minimum number in the pathloss measurement parameter pool among the power control parameter pools is used.

For the type-2 configuration authorized PUSCH transmission, when the UE cannot acquire the SRI or the association information between the SRI and the PUSCH power control parameter, the open-loop power control parameter and the closed-loop power control parameter are processed in the manner of using a configured value of a high layer parameter. The pathloss measurement parameter is processed in the manner of using a power control parameter having the minimum number in the pathloss measurement parameter pool among the power control parameter pools.

Based on the above, when the UE cannot acquire the SRI or the association information between the SRI and the power control parameter of the PUSCH, a power control parameter having a fixed number in the power control parameter pool is used.

It may be seen from this that the MAC CE updating the power control parameter is to update correspondence between an ID of association between the SRI and the PUSCH power control parameter and IDs of various-type parameters (including the ID of pathloss measurement parameter) in their respective parameter pools among the power control parameter pools. The ID of association between the SRI and the power control parameter of the PUSCH may be understood as the value of the SRI field. When there is no SRI field, the problem of how to determine the ID of association between the SRI and the PUSCH power control parameter, and the problem that the manner where the MAC CE updates the power control parameter is invalid when there is no SRI filed exist in related art. For example, there is only one SRS resource in the SRS resource set, a spatial relation of the SRS resource may be updated through the MAC CE, and then, the UE cannot acquire the SRI, but the spatial relation can be acquired through the unique SRS resource. The base station may update or modify the association information between the SRI and the PUSCH power control parameter through high layer signaling or the MAC CE. However, the manner of using the power control parameter having a fixed number in the power control parameter pool causes the manner in which the base station updates or modifies the association between the SRI and the power control parameter is invalid for PUSCH transmission.

Thus, in a case that there is no SRI field in the DCI, when the RRC or the MAC CE updates the power control parameter, the association information ID between the SRI and the PUSCH power control parameter is a fixed value, for example, 0. That is, in the related art, only the ID of association between the SRI and the PUSCH power control parameter corresponds to the value of the SRI field in the DCI, and when there is no SRI field in the DCI, it is necessary to make it clear that the ID of association between the SRI and the PUSCH power control parameters is a fixed value, for example, 0. When there is no SRI field in the DCI, but there is the association information between the SRI and the PUSCH power control parameter, a power control parameter corresponding to the maximum value, the minimum value, a configured value or a predetermined value among association IDs between the SRI and the PUSCH power control parameter may be used, for example, 0.

To solve the preceding problem, in an exemplary implementation, an embodiment of the present application provides a transmitting parameter determination method applied to a first node device. FIG. 6 is a flowchart of a transmitting parameter determination process according to an embodiment of the present application. The method may be applied to the case where the first node device determines a transmitting parameter of uplink transmission and, in particular, determines a power control parameter of PUSCH transmission. The first node device may be a terminal device or the like. Accordingly, as shown in FIG. 6, the transmitting parameter determination method provided in the present application includes step S310.

In step S310, a power control parameter of PUSCH transmission is determined according to association information between an SRI and a PUSCH power control parameter. The power control parameter of the PUSCH transmission includes at least one of an open-loop power control parameter of a PUSCH, a closed-loop power control parameter of a PUSCH, or a pathloss measurement parameter of a PUSCH.

According to this embodiment of the present disclosure, the power control parameter of the PUSCH transmission is determined according to the association information between the SRI and the PUSCH power control parameter. This can effectively solve the problem that the manner of updating a power control parameter through an MAC CE is invalid in the related art, thereby optimizing the mechanism for determining a transmitting parameter of uplink transmission.

In an example, the association information between the SRI and the PUSCH power control parameter includes at least one association element between the SRI and the PUSCH power control parameter. The association element between the SRI and the PUSCH power control parameter includes at least one of an ID of the association element between the SRI and the PUSCH power control parameter, an ID of open-loop power control parameter of the PUSCH, an ID of closed-loop power control parameter of the PUSCH, or an ID of pathloss measurement parameter of the PUSCH. The ID of the open-loop power control parameter of the PUSCH is used for indicating a PUSCH open-loop power control parameter element in an open-loop power control parameter pool of the PUSCH. The PUSCH open-loop power control parameter element includes a target receive power PO and a pathloss compensation coefficient alpha. The target receive power refers to a target receive power of a receiver of uplink transmission, for example, a base station side. The ID of the closed-loop power control parameter of the PUSCH is used for indicating an ID of a closed-loop power control parameter of the PUSCH in a closed-loop power control parameter pool of the PUSCH. For example, if the closed-loop power control parameter pool of the PUSCH includes two pieces of closed-loop power control (or referred to as two closed-loop power control loops) of the PUSCH, then the ID of the closed-loop power control parameter of the PUSCH may be 0 or 1, identifying a first piece of closed-loop power control and a second piece of closed-loop power control, respectively. The ID of the pathloss measurement parameter of the PUSCH is used for indicating a pathloss measurement parameter of the PUSCH in a pathloss measurement parameter pool of the PUSCH. The pathloss measurement parameter of the PUSCH refers to a resource number of a pathloss measurement reference signal. The pathloss measurement reference signal may be a CSI-RS or an SSB.

In an example, the ID of association between the SRI and the PUSCH power control parameter which is included in the association information between the SRI and the PUSCH power control parameter is a predefined value or a pre-configured value.

In an example, the association information between the SRI and the PUSCH power control parameter is configured, reconfigured or updated through high layer signaling, or activated, deactivated or updated through an MAC CE.

In an example, in the case where there is no SRI field in DCI or the number of SRS resource(s) in an SRS resource set is 1, the ID of association between the SRI and the PUSCH power control parameter in the association information between the SRI and the PUSCH power control parameter is a predefined value or a pre-configured value.

Exemplarily, when there is no SRI field in DCI or the number of SRS resource(s) in the SRS resource set is 1, high layer signaling RRC may configure, reconfigure or update the association information between the SRI and the PUSCH power control parameter. When there is no SRI field in DCI or the number of SRS resource(s) in the SRS resource set is 1, MAC CE signaling activates, deactivates or updates the association information between the SRI and the PUSCH power control parameter.

In an example, in the case where at least one of the conditions described below is satisfied, the step in which the power control parameter of the PUSCH transmission is determined according to the association information between the SRI and the PUSCH power control parameter includes that the ID of association between the SRI and the PUSCH power control parameter is determined to be a predefined value or a pre-configured value:

there is no SRI field in DCI that schedules the PUSCH transmission or activates the PUSCH transmission; DCI that schedules the PUSCH transmission or activates the PUSCH transmission has format 0_0; the association information between the SRI and the PUSCH power control parameter exists or is configured; the first node device supports an MAC CE in activating or updating the PUSCH power control parameter; the first node device supports an MAC CE in activating or updating the pathloss measurement parameter of the PUSCH; or in the case where DCI format 0_0 schedules or activates the PUSCH transmission, spatial relation configuration of the PUCCH transmission does not exist or is not provided.

The power control parameter of the PUSCH transmission which is determined according to the association information between the SRI and the PUSCH power control parameter includes at least one of an open-loop power control parameter of the PUSCH, a closed-loop power control parameter of the PUSCH, or a pathloss measurement parameter of the PUSCH corresponding to the determined ID of association between the SRI and the PUSCH power control parameter.

In an example, the predefined value is one of the following: 0, 1, the minimum ID of association between the SRI and the PUSCH power control parameter which is included in the association information between the SRI and the PUSCH power control parameter, the maximum ID of association between the SRI and the PUSCH power control parameter which is included in the association information between the SRI and the PUSCH power control parameter, the number of association elements between the SRI and the PUSCH power control parameter which are included in the association information between the SRI and the PUSCH power control parameter, or the number of association elements between the SRI and the PUSCH power control parameter which are included in the association information between the SRI and the PUSCH power control parameter minus 1. The pre-configured value is one of values ranging from 0 to the number of association elements between the SRI and the PUSCH power control parameter which are included in the association information between the SRI and the PUSCH power control parameter minus 1.

The step in which the power control parameter of the PUSCH transmission is determined according to the association information between the SRI and the PUSCH power control parameter includes that the ID of association between the SRI and the PUSCH power control parameter is determined to be a predefined value or a pre-configured value. The first node device searches the association information between the SRI and the PUSCH power control parameter according to the ID of association between the SRI and the PUSCH power control parameter which is a predefined value or a pre-configured value, so as to acquire a corresponding SRI and a corresponding PUSCH power control parameter to determine the transmission power of the PUSCH, for example, an SRI and a PUSSCH power control parameter corresponding to an ID of association such as sri-PUSCH-PowerControlId, which has a value of 0, between the SRI and the PUSCH power control parameter, where the PUSCH power control parameter corresponding to the ID of association includes a pathloss measurement parameter, such as a pathloss measurement parameter in a pathloss measurement parameter pool identified by PUSCH-PathlossReferenceRS-Id.

In one example, the power control parameter of the PUSCH transmission may be the open-loop power control parameter of the PUSCH. For a type-1 configuration authorized PUSCH and a type-2 configuration authorized PUSCH, open-loop power control parameters are all configured by high layer signaling RRC. When a dynamically authorized PUSCH is scheduled by DCI format 0_0, or by DCI format 0_1 without an SRI field, an open-loop power control parameter of the PUSCH corresponding to the minimum ID of open-loop power control parameter of the PUSCH in the open-loop power control parameter pool of the PUSCH is used. According to the method in this embodiment of the present application, if there is no SRI in the DCI, but there is the association information between the SRI and the PUSCH power control parameter, an open-loop power control parameter corresponding to a parameter of the association information between the SRI and the PUSCH power control parameter in the case where the ID of association between the SRI and the PUSCH power control parameter is equal to X is used.

In an example, the power control parameter of the PUSCH transmission may be the closed-loop power control parameter of the PUSCH. For the type-1 configuration authorized PUSCH and the type-2 configuration authorized PUSCH, closed-loop power control parameters are all configured by high layer signaling RRC. When the dynamically authorized PUSCH is scheduled by DCI format 0_0, or by DCI format 0_1 without an SRI field, a closed-loop power control parameter of the PUSCH corresponding to the minimum ID of closed-loop power control parameter of the PUSCH, that is, closed-loop power control number 0, in the closed-loop power control parameter pool of the PUSCH is used. According to the method of the present application, if there is no SRI in the DCI, but there is the association information between the SRI and the PUSCH power control parameter, a closed-loop power control parameter corresponding to a parameter of the association information between the SRI and the PUSCH power control parameter in the case where the ID of association between the SRI and the PUSCH power control parameter is equal to X is used.

In an example, the power control parameter of the PUSCH transmission may be the pathloss measurement parameter of the PUSCH. When DCI format 0_0 schedules or activates PUSCH transmission, there is no SRI field in the DCI, and there may be one or more SRS resources in the SRS resource set. If there is a spatial relation of the PUCCH, a pathloss measurement parameter of the spatial relation of the PUCCH is used. If there is no spatial relation of the PUCCH, a pathloss measurement parameter corresponding to the minimum ID of pathloss measurement parameter of the PUSCH in a pathloss measurement parameter pool among power control parameter pools of the PUSCH is used. According to the method in this embodiment of the present application, if there is no spatial relation of the PUCCH, but there is the association information between the SRI and the PUSCH power control parameter, a pathloss measurement parameter corresponding to a parameter of the association information between the SRI and the PUSCH power control parameter in the case where the ID of association between the SRI and the PUSCH power control parameter is equal to X is used. When there is 1 SRS resource in the SRS resource set, DCI format 0_1 does not have the SRI. In an embodiment, a pathloss measurement parameter corresponding to the minimum ID of pathloss measurement parameter of the PUSCH in the power control parameter pool is used. According to the method in this embodiment of the present application, if there is no SRI in the DCI, but there is the association information between the SRI and the PUSCH power control parameter, a pathloss measurement parameter corresponding to a parameter of the association information between the SRI and the PUSCH power control parameter in the case where the ID of association between the SRI and the PUSCH power control parameter is equal to X is used. When there is no association information between the SRI and the PUSCH power control parameter, no matter whether there is the SRI in the DCI, a pathloss measurement parameter corresponding to the minimum ID of pathloss measurement parameter of the PUSCH in the PUSCH power control parameter pool is used.

In the preceding description, X is a predefined value or a pre-configured value. The predefined value may be one of the following: 0, 1, the number of association elements between the SRI and the PUSCH power control parameter which are included in the association information between the SRI and the PUSCH power control parameter, or the number of association elements between the SRI and the PUSCH power control parameter which are included in the association information between the SRI and the PUSCH power control parameter minus 1. The pre-configured value may be one of values ranging from 0 to the number of association elements between the SRI and the PUSCH power control parameter which are included in the association information between the SRI and the PUSCH power control parameter minus 1. The pre-configured value is sent by the base station to the UE.

In an exemplary implementation, an embodiment of the present application provides a transmitting parameter determination method applied to a second node device. FIG. 7 is a flowchart of a transmitting parameter determination process according to an embodiment of the present application. The method may be applied to the case where the second node device determines association information between an SRI and a PUSCH power control parameter, so that a first node device determines a power control parameter of PUSCH transmission. The second node device may be a base station device or the like. Accordingly, as shown in FIG. 7, the transmitting parameter determination method provided in the present application includes step S410.

In step S410, association information between an SRI and a PUSCH power control parameter is configured, reconfigured or updated through high layer signaling, or activated, deactivated or updated through an MAC CE. The association information between the SRI and the PUSCH power control parameter is used for determining a power control parameter of PUSCH transmission by a first node device.

The power control parameter of the PUSCH transmission includes at least one of an open-loop power control parameter of a PUSCH, a closed-loop power control parameter of a PUSCH, or a pathloss measurement parameter of a PUSCH.

According to this embodiment of the present disclosure, the association information between the SRI and the PUSCH power control parameter is determined so that the first node device determines the power control parameter of the PUSCH transmission. This can effectively solve the problem that the manner of updating the power control parameter through the MAC CE is invalid in the related art, and optimizes the mechanism for determining a transmitting parameter of uplink transmission.

In an example, the association information between the SRI and the PUSCH power control parameter includes at least one association element between the SRI and the PUSCH power control parameter. The association element between the SRI and the PUSCH power control parameter includes at least one of an ID of the association element between the SRI and the PUSCH power control parameter, an ID of open-loop power control parameter of the PUSCH, an ID of closed-loop power control parameter of the PUSCH, or an ID of pathloss measurement parameter of the PUSCH. The ID of the open-loop power control parameter of the PUSCH is used for indicating a PUSCH open-loop power control parameter element in an open-loop power control parameter pool of the PUSCH. The PUSCH open-loop power control parameter element includes a target receive power PO and a pathloss compensation coefficient alpha. The target receive power refers to a target receive power of a receiver of uplink transmission, such as a base station side. The ID of the closed-loop power control parameter of the PUSCH is used for indicating an ID of closed-loop power control parameter of the PUSCH in a closed-loop power control parameter pool of the PUSCH. For example, if the closed-loop power control parameter pool of the PUSCH includes two pieces of closed-loop power control (or referred to as two closed-loop power control loops) of the PUSCH, then the ID of closed-loop power control parameter of the PUSCH may be 0 or 1, identifying a first piece of closed-loop power control and a second piece of closed-loop power control, respectively. The ID of pathloss measurement parameter of the PUSCH is used for indicating a pathloss measurement parameter of the PUSCH in a pathloss measurement parameter pool of the PUSCH. The pathloss measurement parameter of the PUSCH refers to a resource number of a pathloss measurement reference signal. The pathloss measurement reference signal may be a CSI-RS or an SSB.

In an example, the ID of association between the SRI and the PUSCH power control parameter which is included in the association information between the SRI and the PUSCH power control parameter is a predefined value or a pre-configured value.

In an example, the association information between the SRI and the PUSCH power control parameter is configured, reconfigured or updated through high layer signaling, or activated, deactivated or updated through the MAC CE.

In an example, in the case where there is no SRI field in DCI or the number of SRS resource(s) in an SRS resource set is 1, the ID of association between the SRI and the PUSCH power control parameter in the association information between the SRI and the PUSCH power control parameter is a predefined value or a pre-configured value.

Exemplarily, when there is no SRI field in the DCI or the number of SRS resource(s) in the SRS resource set is 1, the association information between the SRI and the PUSCH power control parameter may be configured, reconfigured or updated by high signaling RRC. When there is no SRI field in the DCI or the number of SRS resource(s) in the SRS resource set is 1, MAC CE signaling may activate, deactivate or update the association information between the SRI and the PUSCH power control parameter.

In an example, in the case where at least one of the conditions described below is satisfied, the step in which the power control parameter of the PUSCH transmission is determined according to the association information between the SRI and the PUSCH power control parameter includes that the ID of association between the SRI and the PUSCH power control parameter is determined to be a predefined value or a pre-configured value:

there is no SRI field in DCI that schedules the PUSCH transmission or activates the PUSCH transmission; DCI that schedules the PUSCH transmission or activates the PUSCH transmission has format 0_0; the association information between the SRI and the PUSCH power control parameter exists or is configured; the first node device supports an MAC CE in activating or updating the PUSCH power control parameter; the first node device supports an MAC CE in activating or updating the pathloss measurement parameter of the PUSCH; or in the case where DCI format 0_0 schedules or activates the PUSCH transmission, spatial relation configuration of the PUCCH transmission does not exist or is not provided.

The power control parameter of the PUSCH transmission which is determined according to the association information between the SRI and the PUSCH power control parameter includes at least one of an open-loop power control parameter of the PUSCH, a closed-loop power control parameter of the PUSCH, or a pathloss measurement parameter of the PUSCH corresponding to the determined ID of association between the SRI and the PUSCH power control parameter.

In an example, the predefined value is one of the following: 0, 1, the minimum ID of association between the SRI and the PUSCH power control parameter which is included in the association information between the SRI and the PUSCH power control parameter, the maximum ID of association between the SRI and the PUSCH power control parameter which is included in the association information between the SRI and the PUSCH power control parameter, the number of association elements between the SRI and the PUSCH power control parameter which are included in the association information between the SRI and the PUSCH power control parameter, or the number of association elements between the SRI and the PUSCH power control parameter which are included in the association information between the SRI and the PUSCH power control parameter minus 1. The pre-configured value is one of values ranging from 0 to the number of association elements between the SRI and the PUSCH power control parameter which are included in the association information between the SRI and the PUSCH power control parameter minus 1.

In an exemplary implementation, an embodiment of the present application provides an electronic device. The device may be configured in a first node device. FIG. 8 is a structural diagram of an electronic device according to an embodiment of the present application. As shown in FIG. 8, the device may include a parameter determination module 510.

The parameter determination module 510 is configured to determine a CC group and a transmitting parameter of uplink transmission of a CC in the CC group according to an MAC CE. The transmitting parameter of the uplink transmission includes spatial relation information and/or power control parameter information. The uplink transmission includes at least one of SRS transmission, PUSCH transmission or PUCCH transmission.

According to the embodiment of the present application, the CC group and the transmitting parameter of the uplink transmission, including the spatial relation information and/or the power control parameter information, of all CCs in the CC group are determined according to the MAC CE. This solves the problem that the mechanism for determining a transmitting parameter of uplink transmission is not perfect, and optimizes the mechanism for determining a transmitting parameter of uplink transmission.

Optionally, the parameter determination module 510 is specifically configured to determine, according to a CC group ID included in the MAC CE, according to a CC group to which a cell ID included in the MAC CE belongs, or according to a CC group to which a cell carrying the MAC CE belongs, a CC group to which the MAC CE is applied.

Optionally, the CC group has at least one of the features described below.

The CC group includes at least one CC. An SRS is configured on each CC in the CC group. SRS resources in the CC group which have the same SRS resource number are associated with the same spatial relation. The CC group includes a spatial relation CC group and/or a power control parameter CC group. The CC group is configured by a high layer parameter. The CC group is determined by a pathloss reference linking parameter. The CC group is a subset of a first-type CC group determined by a pathloss reference linking parameter. The CC group is the same as a first-type CC group determined by a pathloss reference linking parameter. The CC group is determined by a PUCCH group. The CC group is a subset of a PUCCH group. The CC group is the same as a PUCCH group. An SRS has the same CC group as a PUSCH. A spatial relation CC group of an SRS is the same as a power control parameter CC group of the SRS. A spatial relation CC group of a PUSCH is the same as a power control parameter CC group of the PUSCH.

Optionally, the MAC CE includes at least one of a CC group ID, a cell ID, a cell ID of an SRS resource set, a bandwidth part (BWP) ID of an SRS resource set, an SRS resource set ID, at least one SRS resource ID, spatial relation related information of an SRS resource, power control parameter related information of an SRS resource or an SRS resource set, a cell ID of a PUSCH, a BWP ID of a PUSCH, an SRS resource indicator (SRI) of a PUSCH, or power control parameter related information of an SRI. The spatial relation related information includes at least one of: at least one piece of spatial relation information, a CC ID of spatial relation information, or a BWP ID of spatial relation information.

Optionally, the parameter determination module 510 is specifically configured to determine a first SRS resource set to which the MAC CE is applied, and update the power control parameter information according to the first SRS resource set.

Optionally, the parameter determination module 510 is specifically configured to: determine a first SRS resource set to which the MAC CE is applied, determine, according to the first SRS resource set, a second SRS resource set to which the MAC CE is applied, and update the power control parameter information according to the first SRS resource set and/or the second SRS resource set.

Optionally, the parameter determination module 510 is specifically configured to determine an SRS resource to which the MAC CE is applied, and update the spatial relation information according to the SRS resource to which the MAC CE is applied.

Optionally, the parameter determination module 510 is specifically configured to: determine, according to the SRS resource set ID, the cell ID of the SRS resource set, and the bandwidth part (BWP) ID of the SRS resource set which are contained in the MAC CE, the first SRS resource set to which the MAC CE is applied; determine the first SRS resource set according to the SRS resource set ID and the cell ID of the SRS resource set which are contained in the MAC CE, and an activated BWP in a cell identified by the cell ID of the SRS resource set; determine the first SRS resource set according to the SRS resource set ID contained in the MAC CE, and an activated BWP in the cell carrying the MAC CE; or determine the first SRS resource set according to the at least one SRS resource ID included in the MAC CE.

Optionally, the parameter determination module 510 is specifically configured to: use an SRS resource set, which is in accordance with the at least one SRS resource ID included in the MAC CE, as the first SRS resource set; or use an SRS resource set, which is in accordance with K1 SRS resource IDs in the at least one SRS resource ID included in the MAC CE, as the first SRS resource set. K1 is a predefined or pre-configured integer greater than or equal to 1, or determined according to a predefined or pre-configured percentage.

Optionally, the parameter determination module 50 is specifically configured to: use an SRS resource set, which belongs to a CC in the same CC group as the first SRS resource set and has identical SRS resources with the first SRS resource set, as the second SRS resource set to which the MAC CE is applied; use an SRS resource set, which belongs to a CC in the same CC group as the first SRS resource set and has the same SRS resource set ID as the first SRS resource set, as the second SRS resource set to which the MAC CE is applied; or use an SRS resource set, which belongs to a CC in the same CC group as the first SRS resource set and is in accordance with at least K2 SRS resource IDs of SRS resources in the first SRS resource set, as the second SRS resource set to which the MAC CE is applied. K2 is a predefined or pre-configured integer greater than or equal to 1, or determined according to a predefined or pre-configured percentage.

Optionally, the parameter determination module 510 is specifically configured to: determine, according to at least one SRS resource ID included in the MAC CE, the SRS resource to which the MAC CE is applied; determine, according to an SRS resource included in the first SRS resource set, the SRS resource to which the MAC CE is applied; determine, according to an SRS resource included in the second SRS resource set, the SRS resource to which the MAC CE is applied; if an SRS resource ID of an SRS resource included in an SRS resource set that belongs to a CC in the same CC group as the first SRS resource set is the same as an SRS resource ID of an SRS resource in the first SRS resource set, use the SRS resource corresponding to the SRS resource ID as the SRS resource to which the MAC CE is applied; or when an SRS resource ID of an SRS resource included in an SRS resource set that belongs to a CC in the same CC group as the first SRS resource set and has the same usage as the first SRS resource set is the same as an SRS resource ID of an SRS resource in the first SRS resource set, use the SRS resource corresponding to the SRS resource ID as the SRS resource to which the MAC CE is applied.

Optionally, the parameter determination module 510 is specifically configured to: determine a first SRI of PUSCH transmission to which the MAC CE is applied, and update the spatial relation information and/or the power control parameter information according to the first SRI of the PUSCH transmission to which the MAC CE is applied.

Optionally, the parameter determination module 510 is specifically configured to: determine a first SRI of PUSCH transmission to which the MAC CE is applied, determine a second SRI of the PUSCH transmission to which the MAC CE is applied, and update the spatial relation information and/or the power control parameter information according to the first SRI and/or the second SRI of the PUSCH transmission to which the MAC CE is applied.

Optionally, the parameter determination module 510 is specifically configured to: determine, according to the SRI of the PUSCH included in the MAC CE, the first SRI of the PUSCH transmission to which the MAC CE is applied; determine, according to at least one of the SRS resource ID, the SRS resource set ID or the SRI of the PUSCH, the cell ID of the PUSCH, and the BWP ID of the PUSCH which are included in the MAC CE, the first SRI of the PUSCH transmission to which the MAC CE is applied; determine, according to at least one of the SRS resource ID, the SRS resource set ID or the SRI of the PUSCH, and the cell ID of the PUSCH which are included in the MAC CE, and the activated BWP in the cell corresponding to the cell ID of the PUSCH, the first SRI of the PUSCH transmission to which the MAC CE is applied; determine, according to at least one of the SRS resource ID, the SRS resource set ID or the SRI of the PUSCH which are included in the MAC CE, and the activated BWP in the cell carrying the MAC CE, the first SRI of the PUSCH transmission to which the MAC CE is applied; determine, according to at least one of the cell ID of the PUSCH, or the BWP ID of the PUSCH which are included in the MAC CE, the first SRI of the PUSCH transmission to which the MAC CE is applied; determine, according to the cell ID of the PUSCH included in the MAC CE, and the activated BWP in the cell corresponding to the cell ID of the PUSCH, the first SRI of the PUSCH transmission to which the MAC CE is applied; or determine, according to the activated BWP in the cell carrying the MAC CE, the first SRI of the PUSCH transmission to which the MAC CE is applied.

Optionally, the parameter determination module 501 is specifically configured to: use an SRI of a PUSCH which is among SRIs of PUSCHs belonging to a CC in the same CC group as the first SRI of the PUSCH transmission and includes an SRS resource ID which is the same as that included in an SRI of a PUSCH indicated by the MAC CE as the second SRI of the PUSCH transmission to which the MAC CE is applied; or use an SRI of a PUSCH which is among SRIs of PUSCHs belonging to a CC in the same CC group as the first SRI of the PUSCH transmission and includes at least K3 SRS resource ID(s) that is(are) the same as that(those) included in an SRI of a PUSCH indicated by the MAC CE as the second SRI of the PUSCH transmission to which the MAC CE is applied. K3 is a predefined or pre-configured integer greater than or equal to 1, or determined according to a predefined or pre-configured percentage.

Optionally, the device further includes a pathloss measurement parameter pool receiving module, which is configured to receive a pathloss measurement parameter pool configured by a high layer. The pathloss measurement parameter pool configured by the high layer has at least one of the features described below.

A CC or BWP configured with an SRS is independently configured with a pathloss measurement parameter pool of an SRS. More than one CC or BWP configured with an SRS share a pathloss measurement parameter pool of an SRS. More than one CC or BWP configured with an SRS share a pathloss measurement parameter pool of an SRS, where multiple CCs reference an RS of the same CC to measure pathloss. On the same CC or BWP, or in the same CC group, an SRS and a PUSCH share a pathloss measurement parameter pool. On the same CC or BWP, or in the same CC group, an SRS and a PUCCH share a pathloss measurement parameter pool. On the same CC or BWP, or in the same CC group, a PUSCH and a PUCCH share a pathloss measurement parameter pool. On the same CC or BWP, or in the same CC group, an SRS, a PUSCH and a PUCCH share a pathloss measurement parameter pool.

In an exemplary implementation, an embodiment of the present application provides an electronic device. The device may be configured in a second node device. FIG. 9 is a structural diagram of an electronic device according to an embodiment of the present application. As shown in FIG. 9, the device may include a signaling transmitting module 610 and a parameter pool transmitting module 620.

The signaling transmitting module 610 is configured to transmit an MAC CE to a first node device to enable the first node device to determine a CC group and a transmitting parameter of uplink transmission of a CC in the CC group according to the MAC CE. The transmitting parameter of the uplink transmission includes spatial relation information and/or power control parameter information. The uplink transmission includes at least one of SRS transmission, PUSCH transmission or PUCCH transmission.

The parameter pool transmitting module 620 is configured to transmit a pathloss measurement parameter pool configured by a high layer. The power control parameter pool configured by the high layer has at least one of the features described below.

A CC or BWP configured with an SRS is independently configured with a pathloss measurement parameter pool of an SRS. More than one CC or BWP configured with an SRS share a pathloss measurement parameter pool of an SRS. More than one CC or BWP configured with an SRS share a pathloss measurement parameter pool of an SRS, where multiple CCs reference an RS of the same CC to measure pathloss. On the same CC or BWP, or in the same CC group, an SRS and a PUSCH share a pathloss measurement parameter pool. On the same CC or BWP, or in the same CC group, an SRS and a PUCCH share a pathloss measurement parameter pool. On the same CC or BWP, or in the same CC group, a PUSCH and a PUCCH share a pathloss measurement parameter pool. On the same CC or BWP, or in the same CC group, an SRS, a PUSCH and a PUCCH share a pathloss measurement parameter pool.

According to this embodiment of the present application, the second node device transmits the MAC CE to the first node device to enable the first node device to determine the CC group and the transmitting parameter of the uplink transmission of the spatial relation information and/or the power control parameter information of all CCs in the CC group according to the MAC CE. This solves the problem that the mechanism for determining a transmitting parameter of uplink transmission is not perfect, and optimizes the mechanism for determining a transmitting parameter of uplink transmission.

Optionally, the first node device is configured to determine, according to a CC group ID included in the MAC CE, according to a CC group to which a cell ID included in the MAC CE belongs, or according to a CC group to which a cell carrying the MAC CE belongs, a CC group to which the MAC CE is applied.

Optionally, the CC group has at least one of the features described below.

The CC group includes at least one CC. An SRS is configured on each CC in the CC group. SRS resources in the CC group which have the same SRS resource number are associated with the same spatial relation. The CC group includes a spatial relation CC group and/or a power control parameter CC group. The CC group is configured by a high layer parameter. The CC group is determined by a pathloss reference linking parameter. The CC group is a subset of a first-type CC group determined by a pathloss reference linking parameter. The CC group is the same as a first-type CC group determined by a pathloss reference linking parameter. The CC group is determined by a PUCCH group. The CC group is a subset of a PUCCH group. The CC group is the same as a PUCCH group. An SRS has the same CC group as a PUSCH. A spatial relation CC group of an SRS is the same as a power control parameter CC group of the SRS. A spatial relation CC group of a PUSCH is the same as a power control parameter CC group of the PUSCH.

Optionally, the MAC CE includes at least one of a CC group ID, a cell ID, a cell ID of an SRS resource set, a bandwidth part (BWP) ID of an SRS resource set, an SRS resource set ID, at least one SRS resource ID, spatial relation related information of an SRS resource, power control parameter related information of an SRS resource or an SRS resource set, a cell ID of a PUSCH, a BWP ID of a PUSCH, an SRS resource indicator (SRI) of a PUSCH, or power control parameter related information of an SRI. The spatial relation related information includes at least one of: at least one piece of spatial relation information, a CC ID of spatial relation information, or a BWP ID of spatial relation information.

Optionally, the first node device is configured to: determine a first SRS resource set to which the MAC CE is applied, and update the power control parameter information according to the first SRS resource set.

Optionally, the first node device is configured to: determine a first SRS resource set to which the MAC CE is applied, determine, according to the first SRS resource set, a second SRS resource set to which the MAC CE is applied, and update the power control parameter information according to the first SRS resource set and/or the second SRS resource set.

Optionally, the first node device is configured to: determine an SRS resource to which the MAC CE is applied, and update the spatial relation information according to the SRS resource to which the MAC CE is applied.

Optionally, the first node device is configured to: determine, according to the SRS resource set ID, the cell ID of the SRS resource set, and the bandwidth part (BWP) ID of the SRS resource set which are contained in the MAC CE, the first SRS resource set to which the MAC CE is applied; determine the first SRS resource set according to the SRS resource set ID and the cell ID of the SRS resource set which are contained in the MAC CE, and an activated BWP in a cell identified by the cell ID of the SRS resource set; determine the first SRS resource set according to the SRS resource set ID contained in the MAC CE, and an activated BWP in the cell carrying the MAC CE; or determine the first SRS resource set according to the at least one SRS resource ID included in the MAC CE.

Optionally, the first node device is configured to: use an SRS resource set, which is in accordance with the at least one SRS resource ID included in the MAC CE, as the first SRS resource set; or use an SRS resource set, which is in accordance with K1 SRS resource IDs in the at least one SRS resource ID included in the MAC CE, as the first SRS resource set. K1 is a predefined or pre-configured integer greater than or equal to 1, or determined according to a predefined or pre-configured percentage.

Optionally, the first node device is configured to: use an SRS resource set, which belongs to a CC in the same CC group as the first SRS resource set and has identical SRS resources with the first SRS resource set, as the second SRS resource set to which the MAC CE is applied; use an SRS resource set, which belongs to a CC in the same CC group as the first SRS resource set and has the same SRS resource set ID as the first SRS resource set, as the second SRS resource set to which the MAC CE is applied; or use an SRS resource set, which belongs to a CC in the same CC group as the first SRS resource set and is in accordance with at least K2 SRS resource IDs of SRS resources in the first SRS resource set, as the second SRS resource set to which the MAC CE is applied. K2 is a predefined or pre-configured integer greater than or equal to 1, or determined according to a predefined or pre-configured percentage.

Optionally, the first node device is configured to: determine, according to the at least one SRS resource ID included in the MAC CE, the SRS resource to which the MAC CE is applied; determine, according to an SRS resource included in the first SRS resource set, the SRS resource to which the MAC CE is applied; determine, according to an SRS resource included in the second SRS resource set, the SRS resource to which the MAC CE is applied; if an SRS resource ID of an SRS resource included in an SRS resource set that belongs to a CC in the same CC group as the first SRS resource set is the same as an SRS resource ID of an SRS resource in the first SRS resource set, use the SRS resource corresponding to the SRS resource ID as the SRS resource to which the MAC CE is applied; or when an SRS resource ID of an SRS resource included in an SRS resource set that belongs to a CC in the same CC group as the first SRS resource set and has the same usage as the first SRS resource set is the same as an SRS resource ID of an SRS resource in the first SRS resource set, use the SRS resource corresponding to the SRS resource ID as the SRS resource to which the MAC CE is applied.

Optionally, the first node device is configured to: determine a first SRI of PUSCH transmission to which the MAC CE is applied, and update the spatial relation information and/or the power control parameter information according to the first SRI of the PUSCH transmission to which the MAC CE is applied.

Optionally, the first node device is configured to: determine a first SRI of PUSCH transmission to which the MAC CE is applied, determine a second SRI of the PUSCH transmission to which the MAC CE is applied, and update the spatial relation information and/or the power control parameter information according to the first SRI and/or the second SRI of the PUSCH transmission to which the MAC CE is applied.

Optionally, the first node device is configured to: determine, according to an SRI of a PUSCH included in the MAC CE, the first SRI of the PUSCH transmission to which the MAC CE is applied; determine, according to at least one of the SRS resource ID, the SRS resource set ID or the SRI of the PUSCH, the cell ID of the PUSCH, and the BWP ID of the PUSCH which are included in the MAC CE, the first SRI of the PUSCH transmission to which the MAC CE is applied; determine, according to at least one of the SRS resource ID, the SRS resource set ID or the SRI of the PUSCH, and the cell ID of the PUSCH which are included in the MAC CE, and the activated BWP in the cell corresponding to the cell ID of the PUSCH, the first SRI of the PUSCH transmission to which the MAC CE is applied; determine, according to at least one of the SRS resource ID, the SRS resource set ID or the SRI of the PUSCH which are included in the MAC CE, and the activated BWP in the cell carrying the MAC CE, the first SRI of the PUSCH transmission to which the MAC CE is applied; determine, according to at least one of the cell ID of the PUSCH, or the BWP ID of the PUSCH which are included in the MAC CE, the first SRI of the PUSCH transmission to which the MAC CE is applied; determine, according to the cell ID of the PUSCH included in the MAC CE, and the activated BWP in the cell corresponding to the cell ID of the PUSCH, the first SRI of the PUSCH transmission to which the MAC CE is applied; or determine, according to the activated BWP in the cell carrying the MAC CE, the first SRI of the PUSCH transmission to which the MAC CE is applied.

Optionally, the first node device is configured to: use an SRI of a PUSCH which is among SRIs of PUSCHs belonging to a CC in the same CC group as the first SRI of the PUSCH transmission and includes an SRS resource ID which is the same as that included in an SRI of a PUSCH indicated by the MAC CE as the second SRI of the PUSCH transmission to which the MAC CE is applied; or use an SRI of a PUSCH which is among SRIs of PUSCHs belonging to a CC in the same CC group as the first SRI of the PUSCH transmission and includes at least K3 SRS resource ID(s) that is(are) the same as that(those) included in an SRI of a PUSCH indicated by the MAC CE as the second SRI of the PUSCH transmission to which the MAC CE is applied. K3 is a predefined or pre-configured integer greater than or equal to 1, or determined according to a predefined or pre-configured percentage.

In an exemplary implementation, an embodiment of the present application provides an electronic device. The device may be configured in a first node device. FIG. 10 is a structural diagram of an electronic device according to an embodiment of the present application. As shown in FIG. 10, the device may include a power control parameter determination module 710.

The power control parameter determination module 710 is configured to determine a power control parameter of PUSCH transmission according to association information between an SRI and a PUSCH power control parameter. The power control parameter of the PUSCH transmission includes at least one of an open-loop power control parameter of a PUSCH, a closed-loop power control parameter of a PUSCH, or a pathloss measurement parameter of a PUSCH.

According to the embodiment of the present disclosure, the power control parameter of the PUSCH transmission is determined according to the association information between the SRI and the PUSCH power control parameter. This can effectively solve the problem that the manner of updating the power control parameter through the MAC CE is invalid in the related art, thereby optimizing the mechanism for determining a transmitting parameter of uplink transmission.

Optionally, the association information between the SRI and the PUSCH power control parameter includes at least one association element between the SRI and the PUSCH power control parameter. The association element between the SRI and the PUSCH power control parameter includes at least one of an Id of the association element between the SRI and the PUSCH power control parameter, an ID of open-loop power control parameter of the PUSCH, an ID of closed-loop power control parameter of the PUSCH, or an ID of pathloss measurement parameter of the PUSCH. The ID of open-loop power control parameter of the PUSCH is used for indicating a PUSCH open-loop power control parameter element in an open-loop power control parameter pool of the PUSCH. The PUSCH open-loop power control parameter element includes a target receive power PO and a pathloss compensation coefficient alpha. The ID of closed-loop power control parameter of the PUSCH is used for indicating an ID of closed-loop power control parameter in a closed-loop power control parameter pool of the PUSCH. The ID of pathloss measurement parameter of the PUSCH is used for indicating a pathloss measurement parameter of the PUSCH in a pathloss measurement parameter pool of the PUSCH.

Optionally, the ID of association between the SRI and the PUSCH power control parameter which is included in the association information between the SRI and the PUSCH power control parameter is a predefined value or a pre-configured value.

Optionally, the association information between the SRI and the PUSCH power control parameter is configured, reconfigured or updated through high layer signaling, or activated, deactivated or updated through the MAC CE.

Optionally, in the case where there is no SRI field in DCI or the number of SRS resource(s) in an SRS resource set is 1, the ID of association between the SRI and the PUSCH power control parameter in the association information between the SRI and the PUSCH power control parameter is a predefined value or a pre-configured value.

Optionally, in the case where at least one of the conditions described below is satisfied, the step in which the power control parameter of the PUSCH transmission is determined according to the association information between the SRI and the PUSCH power control parameter includes that the ID of association between the SRI and the PUSCH power control parameter is determined to be a predefined value or a pre-configured value: there is no SRI field in DCI that schedules the PUSCH transmission or activates the PUSCH transmission; DCI that schedules the PUSCH transmission or activates the PUSCH transmission has format 0_0; the association information between the SRI and the PUSCH power control parameter exists or is configured; the first node device supports the MAC CE in activating or updating the power control parameter of the PUSCH; the first node device supports the MAC CE in activating or updating the pathloss measurement parameter of the PUSCH; or in the case where DCI format 0_0 schedules or activates the PUSCH transmission, spatial relation configuration of the PUCCH transmission does not exist or is not provided.

Optionally, the predefined value is one of the following: 0, 1, the minimum ID of association between the SRI and the PUSCH power control parameter which is included in the association information between the SRI and the PUSCH power control parameter, the maximum ID of association between the SRI and the PUSCH power control parameter which is included in the association information between the SRI and the PUSCH power control parameter, the number of association elements between the SRI and the PUSCH power control parameter which are included in the association information between the SRI and the PUSCH power control parameter, or the number of association elements between the SRI and the PUSCH power control parameter which are included in the association information between the SRI and the PUSCH power control parameter minus 1. The pre-configured value is one of values ranging from 0 to the number of association elements between the SRI and the PUSCH power control parameter which are included in the association information between the SRI and the PUSCH power control parameter minus 1.

Figure 11:
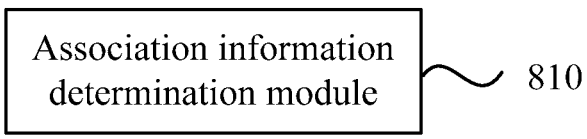
FIG. 11 is a structural diagram of an electronic device according to an embodiment of the present application.

In an exemplary implementation, an embodiment of the present application provides an electronic device. The device may be configured in a second node device. FIG. 11 is a structural diagram of an electronic device according to an embodiment of the present application. As shown in FIG. 11, the device may include an association information determination module 810.

The association information determination module 810 is configured to configure, reconfigure or update association information between an SRI and a PUSCH power control parameter through high layer signaling; or activate, deactivate or update association information between an SRI and a PUSCH power control parameter through an MAC CE. The association information between the SRI and the PUSCH power control parameter is used for determining, by a first node device, a power control parameter of PUSCH transmission. The power control parameter of the PUSCH transmission includes at least one of an open-loop power control parameter of a PUSCH, a closed-loop power control parameter of a PUSCH, or a pathloss measurement parameter of a PUSCH.

According to the embodiment of the present disclosure, the association information between the SRI and the PUSCH power control parameter is determined so that the first node device determines the power control parameter of the PUSCH transmission. This can effectively solve the problem that the manner of updating the power control parameter through the MAC CE is invalid in the related art, and optimizes the mechanism for determining a transmitting parameter of uplink transmission.

Optionally, the association information between the SRI and the PUSCH power control parameter includes at least one association element between the SRI and the PUSCH power control parameter. The association element between the SRI and the PUSCH power control parameter includes at least one of an Id of the association element between the SRI and the PUSCH power control parameter, an ID of open-loop power control parameter of the PUSCH, an ID of closed-loop power control parameter of the PUSCH, or an Id of pathloss measurement parameter of the PUSCH. The ID of open-loop power control parameter of the PUSCH is used for indicating a PUSCH open-loop power control parameter element in an open-loop power control parameter pool of the PUSCH. The PUSCH open-loop power control parameter element includes a target receive power PO and a pathloss compensation coefficient alpha. The ID of closed-loop power control parameter of the PUSCH is used for indicating an ID of closed-loop power control parameter in a closed-loop power control parameter pool of the PUSCH. The ID of pathloss measurement parameter of the PUSCH is used for indicating a pathloss measurement parameter of the PUSCH in a pathloss measurement parameter pool of the PUSCH.

Optionally, the ID of association between the SRI and the PUSCH power control parameter which is included in the association information between the SRI and the PUSCH power control parameter is a predefined value or a pre-configured value.

Optionally, the association information between the SRI and the PUSCH power control parameter is configured, reconfigured or updated through high layer signaling, or activated, deactivated or updated through the MAC CE.

Optionally, in the case where there is no SRI field in DCI or the number of SRS resource(s) in an SRS resource set is 1, the ID of association between the SRI and the PUSCH power control parameter in the association information between the SRI and the PUSCH power control parameter is a predefined value or a pre-configured value.

Optionally, in the case where at least one of the conditions described below is satisfied, the step in which the power control parameter of the PUSCH transmission is determined according to the association information between the SRI and the PUSCH power control parameter includes that the ID of association between the SRI and the PUSCH power control parameter is determined to be a predefined value or a pre-configured value: there is no SRI field in DCI that schedules the PUSCH transmission or activates the PUSCH transmission; DCI that schedules the PUSCH transmission or activates the PUSCH transmission has format 0_0; the association information between the SRI and the PUSCH power control parameter exists or is configured; the first node device supports the MAC CE in activating or updating the power control parameter of the PUSCH; the first node device supports the MAC CE in activating or updating the pathloss measurement parameter of the PUSCH; or in the case where DCI format 0_0 schedules or activates the PUSCH transmission, spatial relation configuration of the PUCCH transmission does not exist or is not provided.

Optionally, the predefined value is one of the following: 0, 1, the minimum ID of association between the SRI and the PUSCH power control parameter which is included in the association information between the SRI and the PUSCH power control parameter, the maximum ID of association between the SRI and the PUSCH power control parameter which is included in the association information between the SRI and the PUSCH power control parameter, the number of association elements between the SRI and the PUSCH power control parameter which are included in the association information between the SRI and the PUSCH power control parameter, or the number of association elements between the SRI and the PUSCH power control parameter which are included in the association information between the SRI and the PUSCH power control parameter minus 1. The pre-configured value is one of values ranging from 0 to the number of association elements between the SRI and the PUSCH power control parameter which are included in the association information between the SRI and the PUSCH power control parameter minus 1.

In the embodiment of the present application, for the function of each module in each device, reference may be made to the corresponding description in the method embodiment described above, which is not repeated here.

Figure 12:
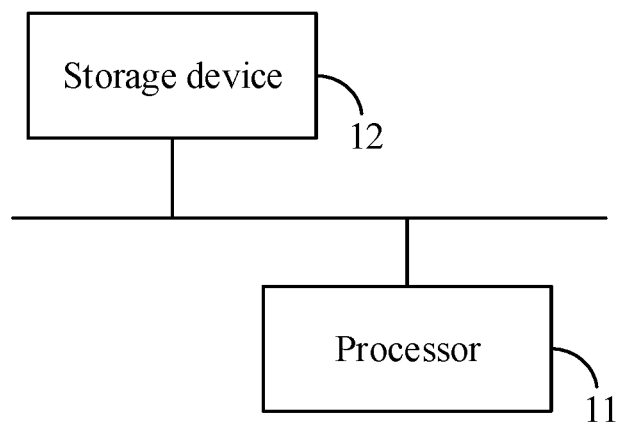
FIG. 12 is a structural diagram of a first node device according to an embodiment of the present application.

FIG. 12 is a structural diagram of a first node device according to an embodiment of the present application. As shown in FIG. 12, a first node device in the present application may further include: one or more processors 11 and a storage device 12.

The first node device may include one or more processors 11. The first node device including one processor 11 is used as an example in FIG. 12. The storage device 12 is configured to store one or more programs. The one or more programs are executed by the one or more processors 11.

The processor 11 and the storage device 12 of the first node device may be connected through a bus or in other manners. The connection through a bus is used as an example in FIG. 12.

As a computer-readable storage medium, the storage device 12 may be configured to store a software program, and a computer-executable program and module. The storage device 12 may include a program storage area and a data storage area. The program storage area may store an operating system and an application program required by at least one function. The data storage area may store data created depending on the use of a device. Additionally, the storage device 12 may include a high-speed random access memory, and may further include a nonvolatile memory, such as at least one disk memory, a flash memory or another nonvolatile solid-state memory. In some examples, the storage device 12 may include memories which are remotely disposed relative to the processor 11 and these remote memories may be connected to the first node device via a network. The examples of the preceding network include, but are not limited to, the Internet, an intranet, a local area network, a mobile communication network and a combination thereof.

Figure 13:
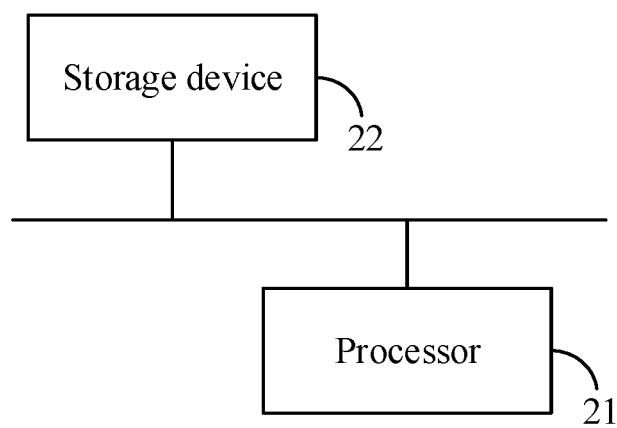
FIG. 13 is a structural diagram of a second node device according to an embodiment of the present application.

FIG. 13 is a structural diagram of a second node device according to an embodiment of the present application. As shown in FIG. 13, a second node device in the present application may further include: one or more processors 21 and a storage device 22.

The second node device may include one or more processors 21. The second node device including one processor 21 is used as an example in FIG. 13. The storage device 22 is configured to store one or more programs. The one or more programs are executed by the one or more processors 21.

The processor 21 and the storage device 22 of the second node device may be connected through a bus or in other manners. The connection through a bus is used as an example in FIG. 13.

As a computer-readable storage medium, the memory 22 may be configured to store a software program, and a computer-executable program and module. The storage device 22 may include a program storage area and a data storage area. The program storage area may store an operating system and an application program required by at least one function. The data storage area may store data created depending on the use of a device. Additionally, the storage device 22 may include a high-speed random access memory, and may further include a nonvolatile memory, such as at least one disk memory, a flash memory or another nonvolatile solid-state memory. In some examples, the storage device 22 may include memories which are remotely disposed relative to the processor 21 and these remote memories may be connected to the second node device via a network. The examples of the preceding network include, but are not limited to, the Internet, an intranet, a local area network, a mobile communication network and a combination thereof.

An embodiment of the present application further provides a computer storage medium storing a computer program. The computer program is configured to, when executed by a computer processor, implement any transmitting parameter determination method of the embodiments of the present application described above: determining a CC group and a transmitting parameter of uplink transmission of a CC in the CC group according to an MAC CE, where the transmitting parameter of the uplink transmission includes spatial relation information and/or power control parameter information; and the uplink transmission includes at least one of sounding reference signal (SRS) transmission, physical uplink shared channel (PUSCH) transmission or physical uplink control channel (PUCCH) transmission.

Alternatively, the computer program is configured to, when executed by a computer processor, implement any transmitting parameter determination method of the embodiments of the present application described above: transmitting an MAC CE to a first node device to enable the first node device to determine a CC group and a transmitting parameter of uplink transmission of a CC in the CC group according to the MAC CE, where the transmitting parameter of the uplink transmission includes spatial relation information and/or power control parameter information; and the uplink transmission includes at least one of SRS transmission, PUSCH transmission or PUCCH transmission; transmitting a pathloss measurement parameter pool configured by a high layer, where the pathloss measurement parameter pool configured by the high layer has the following features: a CC or BWP configured with an SRS is independently configured with a pathloss measurement parameter pool of an SRS; more than one CC or BWP configured with an SRS share a pathloss measurement parameter pool of an SRS; more than one CC or BWP configured with an SRS share a pathloss measurement parameter pool of an SRS, where multiple CCs reference an RS of the same CC to measure pathloss; on the same CC or BWP, or in the same CC group, the SRS and the PUSCH share a pathloss measurement parameter pool; on the same CC or BWP, or in the same CC group, an SRS and a PUCCH share a pathloss measurement parameter pool; on the same CC or BWP, or in the same CC group, a PUSCH and a PUCCH share a pathloss measurement parameter pool; or on the same CC or BWP, or in the same CC group, an SRS, a PUSCH and a PUCCH share a pathloss measurement parameter pool.

Alternatively, the computer program is configured to, when executed by a computer processor, implement any transmitting parameter determination method of the embodiments of the present application described above: determining a power control parameter of PUSCH transmission according to association information between an SRI and a PUSCH power control parameter, where the power control parameter of the PUSCH transmission includes at least one of an open-loop power control parameter of a PUSCH, a closed-loop power control parameter of a PUSCH, or a pathloss measurement parameter of a PUSCH.

Alternatively, the computer program is configured to, when executed by a computer processor, implement any transmitting parameter determination method of the embodiments of the present application described above: configuring, reconfiguring or updating association information between an SRI and a PUSCH power control parameter through high layer signaling; or activating, deactivating or updating association information between an SRI and a PUSCH power control parameter through an MAC CE, where the association information between the SRI and the PUSCH power control parameter is used for determining, by a first node device, a power control parameter of PUSCH transmission; and the power control parameter of the PUSCH transmission includes at least one of an open-loop power control parameter of a PUSCH, a closed-loop power control parameter of a PUSCH, or a pathloss measurement parameter of a PUSCH.

In this embodiment of the present application, the computer storage medium may be any combination of one or more computer readable media. The computer readable medium may be a computer readable signal medium or a computer readable storage medium. The computer readable storage medium may be, for example, but not limited to, an electrical, magnetic, optical, electromagnetic, infrared or semiconductor system, device or component, or any combination thereof. The computer readable storage medium includes (a non-exhaustive list): an electrical connection having one or more wires, a portable computer disk, a hard disk, a random access memory (RAM), a read-only memory (ROM), an erasable programmable read only memory (EPROM), a flash memory, an optical fiber, a portable compact disk read-only memory (CD-ROM), an optical memory component, a magnetic memory component, or any appropriate combination thereof. In this document, the computer readable storage medium may be any tangible medium containing or storing a program. The program may be used by an instruction execution system, apparatus or component, or used in conjunction with an instruction execution system, apparatus or component.

The computer readable signal medium may include a data signal propagating in baseband or as part of a carrier wave. The computer readable signal medium carries computer readable program codes. Such a propagated data signal may be in various forms that include, but are not limited to, an electromagnetic signal, an optical signal, or any appropriate combination thereof. The computer readable signal medium may further be any computer readable medium other than the computer readable storage medium. The computer readable medium may transmit, propagate or transmit a program used by an instruction execution system, apparatus or component, or used in conjunction with the instruction execution system, apparatus or component.

The program codes contained on the computer readable medium may be transmitted on any appropriate medium, including, but not limited to, radio, a wire, an optical cable, radio frequency (RF) and the like, or any appropriate combination thereof.

Computer program codes for implementing the operations of the present disclosure may be written in one or more programming languages or a combination thereof. The programming languages include an object-oriented programming language such as Java, Smalltalk, C++, and further include a conventional procedural programming language such as "C" or a similar programming language. The program codes may be executed entirely on a user computer, partially on a user computer, as an independent software package, partially on a user computer and partially on a remote computer, or entirely on a remote computer or a server. In the case related to a remote computer, the remote computer may be connected to a user computer via any kind of network including a local area network (LAN) or a wide area network (WAN), or may be connected to an external computer (for example, via the Internet through an Internet service provider).

The above are only exemplary embodiments of the present application and are not intended to limit the scope of the present application.

The term user terminal encompasses any appropriate type of radio user device, such as a mobile phone, a portable data processing device, a portable web browser or a vehicle-mounted mobile station.

Generally, the multiple embodiments of the present application may be implemented in hardware or special purpose circuits, software, logic or any combination thereof. For example, some aspects may be implemented in hardware while other aspects may be implemented in firmware or software that may be executed by a controller, a microprocessor, or other computing apparatus, although the present application is not limited thereto.

The embodiments of the present application may be implemented by executing, by a data processor of a mobile apparatus, computer program instructions, for example, in a processor entity, or by hardware, or by a combination of software and hardware. The computer program instructions may be assembly instructions, instruction set architecture (ISA) instructions, machine instructions, machine-related instructions, microcodes, firmware instructions, status setting data, or source codes or object codes written in any combination of one or more programming languages.

A block diagram of any logic flow in the drawings of the present application may represent program steps, or may represent interconnected logic circuits, modules and functions, or may represent a combination of program steps and logic circuits, modules and functions. The computer program may be stored on a memory. The memory may be of any type appropriate for the local technical environment and may be implemented using any appropriate data storage technology, such as, but not limited to, a read-only memory (ROM), a random access memory (RAM), an optical storage apparatus and system (a digital video disc (DVD) or a CD), and the like. The computer readable medium may include a non-transitory storage medium. The data processor may be of any type appropriate for the local technical environment, such as, but not limited to, a general purpose computer, a special purpose computer, a microprocessor, a digital signal processor (DSP), an application specific integrated circuit (ASIC), a field-programmable gate array (FPGA), and a processor based on a multi-core processor architecture.

Base on the above, the present application includes at least the following items:

1. a transmitting parameter determination method, applied to a first node device and including:
    determining a component carrier (CC) group and a transmitting parameter of uplink transmission of a CC in the CC group according to a medium access control-control element (MAC CE), where
    the transmitting parameter of the uplink transmission includes spatial relation information and/or power control parameter information; and
    the uplink transmission includes at least one of channel sounding reference signal (SRS) transmission, physical uplink shared channel (PUSCH) transmission or physical uplink control channel (PUCCH) transmission.
2. the method of item 1, where determining the CC group according to the MAC CE includes: determining, according to a CC group ID included in the MAC CE, according to a CC group to which a cell ID included in the MAC CE belongs, or according to a CC group to which a cell carrying the MAC CE belongs, a CC group to which the MAC CE is applied.
3. the method of item 1, where the CC group has at least one of the following features:
    the CC group includes at least one CC;
    an SRS is configured on each CC in the CC group;
    SRS resources the CC group which have having the same SRS resource ID are associated with the same spatial relation;
    the CC group includes a spatial relation CC group and/or a power control parameter CC group;
    the CC group is configured by a high layer parameter;
    the CC group is determined by a pathloss reference linking parameter;
    the CC group is a subset of a first-type CC group determined by a pathloss reference linking parameter;
    the CC group is the same as a first-type CC group determined by a pathloss reference linking parameter;
    the CC group is determined by a PUCCH group;
    the CC group is a subset of a PUCCH group;
    the CC group is the same as a PUCCH group;
    an SRS has the same CC group as a PUSCH;
    a spatial relation CC group of an SRS is the same as a power control parameter CC group of the SRS; or
    a spatial relation CC group of a PUSCH is the same as a power control parameter CC group of the PUSCH.
4. The method of item 1, where the MAC CE includes at least one of a CC group ID, a cell ID, a cell ID of an SRS resource set, a bandwidth part (BWP) ID of an SRS resource set, an SRS resource set ID, at least one SRS resource ID, spatial relation related information of an SRS resource, power control parameter related information of an SRS resource or an SRS resource set, a cell ID of a PUSCH, a BWP ID of a PUSCH, an SRS resource indicator (SRI) of a PUSCH, or power control parameter related information of an SRI, where
    the spatial relation related information includes at least one of: at least one piece of spatial relation information, a CC ID of spatial relation information, or a BWP ID of spatial relation information; and
    the power control parameter related information includes at least one of: a power control parameter, a CC ID of a power control parameter, or a BWP ID of a power control parameter.
5. The method of item 1 or 4, where determining the CC group and the transmitting parameter of the uplink transmission of each CC in the CC group according to the MAC CE includes:
    determining a first SRS resource set to which the MAC CE is applied; and
    updating the power control parameter information according to the first SRS resource set; or determining a first SRS resource set to which the MAC CE is applied;
    determining, according to the first SRS resource set, a second SRS resource set to which the MAC CE is applied; and
    updating the power control parameter information according to the first SRS resource set and/or the second SRS resource set.
6. The method of item 1, 4 or 5, where determining the CC group and the transmitting parameter of the uplink transmission of each CC in the CC group according to the MAC CE includes:
    determining an SRS resource to which the MAC CE is applied; and
    updating the spatial relation information according to the SRS resource to which the MAC CE is applied.
7. The method of item 5, determining the first SRS resource set to which the MAC CE is applied includes:
    determining, according to an SRS resource set ID, a cell ID of an SRS resource set and a bandwidth part (BWP) ID of an SRS resource set which are included in the MAC CE, the first SRS resource set to which the MAC CE is applied;
    determining the first SRS resource set according to an SRS resource set ID and a cell ID of an SRS resource set which are included in the MAC CE, and an activated BWP in a cell identified by the cell ID of the SRS resource set;

determining the first SRS resource set according to an SRS resource set ID included in the MAC CE, and an activated BWP in a cell carrying the MAC CE; or determining the first SRS resource set according to at least one SRS resource ID included in the MAC CE.

8. The method of item 7, determining the first SRS resource set according to the at least one SRS resource ID included in the MAC CE includes:

using an SRS resource set, which is in accordance with the at least one SRS resource ID included in the MAC CE, as the first SRS resource set; or using an SRS resource set, which is in accordance with K1 SRS resource IDs in the at least one SRS resource ID included in the MAC CE, as the first SRS resource set, wherein K1 is a predefined or pre-configured integer greater than or equal to 1, or determined according to a predefined or pre-configured percentage.

9. The method of item 5, determining the second SRS resource set to which the MAC CE is applied includes:

using an SRS resource set, which belongs to a CC in the same CC group as the first SRS resource set and is in accordance with an SRS resource in the first SRS resource set, as the second SRS resource set to which the MAC CE is applied;

using an SRS resource set, which belongs to a CC in the same CC group as the first SRS resource set and has the same SRS resource set ID as the first SRS resource set, as the second SRS resource set to which the MAC CE is applied; or using an SRS resource set, which belongs to a CC in the same CC group as the first SRS resource set and is in accordance with at least K2 SRS resource IDs of SRS resources in the first SRS resource set, as the second SRS resource set to which the MAC CE is applied, where K2 is a predefined or pre-configured integer greater than or equal to 1, or determined according to a predefined or pre-configured percentage.

10. The method of item 6, where determining the SRS resource to which the MAC CE is applied includes at least one of the following:

determining, according to at least one SRS resource ID included in the MAC CE, the SRS resource to which the MAC CE is applied;

determining, according to an SRS resource included in a first SRS resource set, the SRS resource to which the MAC CE is applied;

determining, according to an SRS resource included in a second SRS resource set, the SRS resource to which the MAC CE is applied;

in response to an SRS resource ID of an SRS resource included in an SRS resource set that belongs to a CC in the same CC group as a first SRS resource set being the same as an SRS resource ID of an SRS resource in the first SRS resource set, using the SRS resource corresponding to the SRS resource ID as the SRS resource to which the MAC CE is applied; or in response to an SRS resource ID of an SRS resource included in an SRS resource set that belongs to a CC in the same CC group as a first SRS resource set and has the same usage as the first SRS resource set being the same as an SRS resource ID of an SRS resource in the first SRS resource set, using the SRS resource corresponding to the SRS resource ID as the SRS resource to which the MAC CE is applied.

11. The method of item 1 or 4, where determining the CC group and the transmitting parameter of the uplink transmission of each CC in the CC group according to the MAC CE includes:

determining a first SRI of PUSCH transmission to which the MAC CE is applied; and updating the spatial relation information and/or the power control parameter information according to the first SRI of the PUSCH transmission to which the MAC CE is applied; or determining a first SRI of PUSCH transmission to which the MAC CE is applied;

determining a second SRI of PUSCH transmission to which the MAC CE is applied; and updating the spatial relation information and/or the power control parameter information according to the first SRI and/or the second SRI of the PUSCH transmission to which the MAC CE is applied.

12. The method of item 11, where determining the first SRI of the PUSCH transmission to which the MAC CE is applied includes:

determining, according to an SRI of a PUSCH included in the MAC CE, the first SRI of the PUSCH transmission to which the MAC CE is applied;

determining, according to at least one of an SRS resource ID, an SRS resource set ID or an SRI of a PUSCH, a cell ID of a PUSCH, and a BWP ID of a PUSCH which are included in the MAC CE, the first SRI of the PUSCH transmission to which the MAC CE is applied;

determining, according to at least one of an SRS resource ID, an SRS resource set ID or an SRI of a PUSCH, and a cell ID of a PUSCH which are included in the MAC CE, and an activated BWP in a cell corresponding to the cell ID of the PUSCH, the first SRI of the PUSCH transmission to which the MAC CE is applied;

determining, according to at least one of an SRS resource ID, an SRS resource set ID or an SRI of a PUSCH which are included in the MAC CE, and an activated BWP in a cell carrying the MAC CE, the first SRI of the PUSCH transmission to which the MAC CE is applied;

determining, according to at least one of a cell ID of a PUSCH, or a BWP ID of a PUSCH which are included in the MAC CE, the first SRI of the PUSCH transmission to which the MAC CE is applied;

determining, according to a cell ID of a PUSCH included in the MAC CE, and an activated BWP in a cell corresponding to the cell ID of the PUSCH, the first SRI of the PUSCH transmission to which the MAC CE is applied; or determining, according to an activated BWP in a cell carrying the MAC CE, the first SRI of the PUSCH transmission to which the MAC CE is applied.

13. The method of item 11, where determining the second SRI of the PUSCH transmission to which the MAC CE is applied includes:

using an SRI of a PUSCH which is among SRIs of PUSCHs belonging to a CC in the same CC group as the first SRI of the PUSCH transmission and includes an SRS resource ID which is the same as that included in an SRI of a PUSCH indicated by the MAC CE as the second SRI of the PUSCH transmission to which the MAC CE is applied; or using an SRI of a PUSCH which is among SRIs of PUSCHs belonging to a CC in the same CC group as the first SRI of the PUSCH transmission and includes at least K3 SRS resource ID(s) that is(are) the same as that(those) included in an SRI of a PUSCH indicated by the MAC CE as the second SRI of the PUSCH transmission to which the MAC CE is applied, where K3 is a predefined or pre-configured integer greater than or equal to 1, or determined according to a predefined or pre-configured percentage.

14. The method of item 1, further including:

receiving a pathloss measurement parameter pool configured by a high layer, where the pathloss measurement parameter pool configured by the high layer has at least one of the following features:

a CC or a BWP configured with an SRS is independently configured with a pathloss measurement parameter pool of an SRS;

more than one CC or BWP configured with an SRS share a pathloss measurement parameter pool of an SRS;

more than one CC or BWP configured with an SRS share a pathloss measurement parameter pool of an SRS, multiple CCs referring an RS of a CC to measure pathloss;

on the same CC or BWP, or in the same CC group, an SRS and a PUSCH share a pathloss measurement parameter pool;

on the same CC or BWP, or in the same CC group, an SRS and a PUCCH share a pathloss measurement parameter pool;

on the same CC or BWP, or in the same CC group, a PUSCH and a PUCCH share a pathloss measurement parameter pool; or on the same CC or BWP, or in the same CC group, an SRS, a PUSCH and a PUCCH share a pathloss measurement parameter pool.

15. A transmitting parameter determination method, applied to a second node device and including:

transmitting an MAC CE to a first node device to enable the first node device to determine a CC group and a transmitting parameter of uplink transmission of a CC in the CC group according to the MAC CE, where the transmitting parameter of the uplink transmission includes spatial relation information and/or power control parameter information; and the uplink transmission includes at least one of SRS transmission, PUSCH transmission or PUCCH transmission.

16. A transmitting parameter determination method, applied to a first node device and including:

determining a power control parameter of PUSCH transmission according to association information between an SRI and a PUSCH power control parameter, where the power control parameter of the PUSCH transmission includes at least one of an open-loop power control parameter of a PUSCH, a closed-loop power control parameter of a PUSCH, or a pathloss measurement parameter of a PUSCH.

17. The method of item 16, where the association information between the SRI and the PUSCH power control parameter includes at least one association element between the SRI and the PUSCH power control parameter; and the association element between the SRI and the PUSCH power control parameter includes at least one of an ID of the association element between the SRI and the PUSCH power control parameter, an ID of open-loop power control parameter of the PUSCH, an ID of closed-loop power control parameter of the PUSCH, or an ID of pathloss measurement parameter of the PUSCH, where the ID of open-loop power control parameter of the PUSCH is used for indicating an PUSCH open-loop power control parameter element in an open-loop power control parameter pool of the PUSCH, and the PUSCH open-loop power control parameter element includes a target receive power and a pathloss compensation coefficient alpha;

the ID of closed-loop power control parameter of the PUSCH is used for indicating an ID of a closed-loop power control parameter of the PUSCH in a closed-loop power control parameter pool of the PUSCH; and the ID of pathloss measurement parameter of the PUSCH is used for indicating a pathloss measurement parameter of the PUSCH in a pathloss measurement parameter pool of the PUSCH.

18. The method of item 16 or 17, where an ID of an association between the SRI and the PUSCH power control parameter which is included in the association information between the SRI and the PUSCH power control parameter is a predefined value or a pre-configured value.

19. The method of item 16, where the association information between the SRI and the PUSCH power control parameter is configured, reconfigured or updated through high layer signaling, or activated, deactivated or updated through an MAC CE.

20. The method of item 16 or 19, in the case where there is no SRI field in DCI or the number of SRS resource(s) in an SRS resource set is 1, an ID of an association between the SRI and the PUSCH power control parameter which is in the association information between the SRI and the PUSCH power control parameter is a predefined value or a pre-configured value.

21. The method of item 16, in the case where at least one of the following conditions is satisfied, determining the power control parameter of the PUSCH transmission according to the association information between the SRI and the PUSCH power control parameter includes determining an ID of an association between the SRI and the PUSCH power control parameter to be a predefined value or a pre-configured value:

there is no SRI field in DCI that schedules the PUSCH transmission or activates the PUSCH transmission;

DCI that schedules the PUSCH transmission or activates the PUSCH transmission has format 0_0;

the association information between the SRI and the PUSCH power control parameter exists or is configured;

the first node device supports an MAC CE in activating or updating the PUSCH power control parameter;

the first node device supports an MAC CE in activating or updating the pathloss measurement parameter of the PUSCH; or in the case where DCI format 0_0 schedules or activates the PUSCH transmission, spatial relation configuration of the PUCCH transmission does not exist or is not provided.

22. The method of item 18, 20 or 21, the predefined value is one of the following: 0, 1, a minimum ID of the association between the SRI and the PUSCH power control parameter which is included in the association information between the SRI and the PUSCH power control parameter, a maximum ID of the association between the SRI and the PUSCH power control parameter which is included in the association information between the SRI and the PUSCH power control parameter, the number of association elements between the SRI and the PUSCH power control parameter which are included in the association information between the SRI and the PUSCH power control parameter, or the number of association elements between the SRI and the PUSCH power control parameter which are included in the association information between the SRI and the PUSCH power control parameter minus 1; and the pre-configured value may be one of values ranging from 0 to the number of association elements between the SRI and the PUSCH power control parameter which are included in the association information between the SRI and the PUSCH power control parameter minus 1.

23. A transmitting parameter determination method, applied to a second node device and including:

configuring, reconfiguring or updating association information between an SRI and a PUSCH power control parameter through high layer signaling, or activating, deactivating or updating association information between an SRI and a PUSCH power control parameter through an MAC CE, where the association information between the SRI and the PUSCH power control parameter is used for determining, by a first node device, a power control parameter of PUSCH transmission; and the power control parameter of the PUSCH transmission includes at least one of an open-loop power control parameter of a PUSCH, a closed-loop power control parameter of a PUSCH, or a pathloss measurement parameter of a PUSCH.

24. The method of item 23, where an ID of an association between the SRI and the PUSCH power control parameter which is included in the association information between the SRI and the PUSCH power control parameter is a predefined value or a pre-configured value, where the predefined value is one of the following: 0, 1, a minimum ID of the association between the SRI and the PUSCH power control parameter which is included in the association information between the SRI and the PUSCH power control parameter, a maximum ID of the association between the SRI and the PUSCH power control parameter which is included in the association information between the SRI and the PUSCH power control parameter, the number of association elements between the SRI and the PUSCH power control parameter which are included in the association information between the SRI and the PUSCH power control parameter, or the number of association elements between the SRI and the PUSCH power control parameter which are included in the association information between the SRI and the PUSCH power control parameter minus 1; and the pre-configured value may be one of values ranging from 0 to the number of association elements between the SRI and the PUSCH power control parameter which are included in the association information between the SRI and the PUSCH power control parameter minus 1.

25. An electronic device, including a memory and a processor, where the memory stores a computer program, the processor is configured to run the computer program to execute the transmitting parameter determination method of any one of items 1 to 14; or is configured to, when operating, execute the transmitting parameter determination method of item 15; or is configured to, when operating, execute the transmitting parameter determination method of any one of items 16 to 22; or is configured to, when operating, execute the transmitting parameter determination method of item 23 or 24.

26. A device, including:
one or more processors; and
a storage device, which is configured to store one or more programs;
where when the one or more programs are executed by the one or more processors, the one or more processors implement the transmitting parameter determination method of any one of items 1 to 14, or implement the transmitting parameter determination method of item 15, or implement the transmitting parameter determination method of any one of items 16 or 22, or implement the transmitting parameter determination method of item 23 or 24.

27. A computer storage medium, storing a computer program, where the program, when executed by a processor, implements the transmitting parameter determination method of any one of items 1 to 14, or implements the transmitting parameter determination method of item 15, or implements the transmitting parameter determination method of any one of items 16 to 22, or implements the transmitting parameter determination method of item 23 or 24.

What is claimed is:

1. A transmitting parameter determination method, applied to a first node device and comprising:
   determining a power control parameter of a physical uplink shared channel (PUSCH) transmission according to association information between a sounding reference signal resource indicator (SRI) and a pathloss measurement parameter of a PUSCH,
   wherein the association information includes (1) an association element identifier (ID) between the SRI and the pathloss measurement parameter of the PUSCH and (2) an ID of the pathloss measurement parameter of the PUSCH,
   wherein the ID of the pathloss measurement parameter of the PUSCH indicates a pathloss measurement parameter of the PUSCH in a pathloss measurement parameter pool of the PUSCH; and
   transmitting the PUSCH transmission based on the power control parameter,
   wherein the association element ID between the SRI and the pathloss measurement parameter of the PUSCH is a predefined value,
   wherein there is no SRI field included in a downlink control information (DCI) scheduling the PUSCH transmission or activating the PUSCH transmission and the first node device supports a MAC CE updating the pathloss measurement parameter of the PUSCH,
   wherein the predefined value is 0.

2. A non-transitory computer storage medium having computer program stored thereupon, the computer program, when executed by a processor, causes the processor to implement the method of claim 1.

3. An electronic device, applied to a first node device and comprising a processor configured to:
   determine a power control parameter of physical uplink shared channel (PUSCH) transmission according to association information between a sounding reference signal resource indicator (SRI) and a pathloss measurement parameter of a PUSCH,
   wherein the association information includes (1) an association element identifier (ID) between the SRI and the pathloss measurement parameter of the PUSCH and (2) an ID of the pathloss measurement parameter of the PUSCH, wherein the ID of the pathloss measurement parameter of the PUSCH indicates a pathloss measurement parameter of the PUSCH in a pathloss measurement parameter pool of the PUSCH; and transmit the PUSCH transmission based on the power control parameter, wherein the association element ID between the SRI and the pathloss measurement parameter of the PUSCH is a predefined value, wherein there is no SRI field included in a downlink control information (DCI) scheduling the PUSCH transmission or activating the PUSCH transmission and the first node device supports a MAC CE updating the pathloss measurement parameter of the PUSCH, wherein the predefined value is 0.

4. A method for wireless communication applied to a second node device, comprising:

receiving a physical uplink shared channel (PUSCH) transmission from a first node device which supports a MAC CE updating a pathloss measurement parameter of a PUSCH, wherein a power control parameter of the PUSCH transmission is based on association information between a sounding reference signal resource indicator (SRI) and the pathloss measurement parameter of the PUSCH, wherein the association information includes (1) an association element identifier (ID) between the SRI and the pathloss measurement parameter of the PUSCH and (2) an ID of the pathloss measurement parameter of the PUSCH, and wherein the ID of the pathloss measurement parameter of the PUSCH indicates a pathloss measurement parameter of the PUSCH in a pathloss measurement parameter pool of the PUSCH, wherein the association element ID between the SRI and the pathloss measurement parameter of the PUSCH is a predefined value, wherein there is no SRI field included in a downlink control information (DCI) scheduling the PUSCH transmission or activating the PUSCH transmission, wherein the predefined value is 0.

5. A non-transitory computer storage medium having computer program stored thereupon, the computer program, when executed by a processor, causes the processor to implement the method of claim 4.

6. An electronic device, applied to a second node device and comprising a processor configured to:

receive a physical uplink shared channel (PUSCH) transmission from a first node device which supports a MAC CE updating a pathloss measurement parameter of a PUSCH, wherein a power control parameter of the PUSCH transmission is based on association information between a sounding reference signal resource indicator (SRI) and the pathloss measurement parameter of the PUSCH, wherein the association information includes (1) an association element identifier (ID) between the SRI and the pathloss measurement parameter of the PUSCH and (2) an ID of the pathloss measurement parameter of the PUSCH, wherein the ID of the pathloss measurement parameter of the PUSCH indicates a pathloss measurement parameter of the PUSCH in a pathloss measurement parameter pool of the PUSCH, wherein the association element ID between the SRI and the pathloss measurement parameter of the PUSCH is a predefined value, wherein there is no SRI field included in a downlink control information (DCI) scheduling the PUSCH transmission or activating the PUSCH transmission, wherein the predefined value is 0.

* * * * *